(12) United States Patent
Salter et al.

(10) Patent No.: US 9,464,887 B2
(45) Date of Patent: Oct. 11, 2016

(54) ILLUMINATED HITCH ANGLE DETECTION COMPONENT

(71) Applicant: Ford Global Technologies, LLC, Dearborn, MI (US)

(72) Inventors: Stuart C. Salter, White Lake, MI (US); Erick Michael Lavoie, Dearborn, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/821,195

(22) Filed: Aug. 7, 2015

(65) Prior Publication Data

US 2015/0345939 A1 Dec. 3, 2015

Related U.S. Application Data

(63) Continuation-in-part of application No. 14/603,636, filed on Jan. 23, 2015, which is a continuation-in-part of application No. 14/086,442, filed on Nov. 21, 2013.

(51) Int. Cl.
*B60Q 1/00* (2006.01)
*B60Q 3/00* (2006.01)
(Continued)

(52) U.S. Cl.
CPC .............. *G01B 11/272* (2013.01); *B60D 1/00* (2013.01); *B60Q 1/22* (2013.01); *B60Q 1/305* (2013.01); *B60Q 3/0216* (2013.01); *B60Q 3/0293* (2013.01); *B60Q 3/06* (2013.01);
(Continued)

(58) Field of Classification Search
CPC .......... B60D 1/00; B60D 1/22; B60D 1/305; B60D 1/36; B60Q 3/06; F21S 48/00; F21S 48/214; F21S 48/215; F21S 48/2212
USPC .................................. 362/485, 487, 509–510
See application file for complete search history.

(56) References Cited

U.S. PATENT DOCUMENTS 2,984,011 A 5/1961 Hamilton
4,430,637 A 2/1984 Koch-Ducker et al.
(Continued)

FOREIGN PATENT DOCUMENTS

CN 101337492 A 1/2009
CN 201169230 Y 2/2009
(Continued)

OTHER PUBLICATIONS

Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.
(Continued)

*Primary Examiner* — Jason Moon Han
(74) *Attorney, Agent, or Firm* — Vichit Chea; Price Heneveld LLP

(57) ABSTRACT

A lighting system for a trailer assembly is provided herein. The lighting system includes a hitch angle detection component having a predefined pattern thereon. A light source is disposed within the hitch angle detection component. A photoluminescent structure is disposed on the light source. The photoluminescent structure is configured to luminesce in response to excitation by light output from at least a portion of the light source.

20 Claims, 12 Drawing Sheets

(51) Int. Cl.
*G01B 11/27* (2006.01)
*F21S 8/10* (2006.01)
*B60Q 3/02* (2006.01)
*B60Q 3/06* (2006.01)
*H05B 37/02* (2006.01)
*B60D 1/00* (2006.01)
*B60Q 1/22* (2006.01)
*B60Q 1/30* (2006.01)

(52) U.S. Cl.
CPC ............. *F21S 48/00* (2013.01); *F21S 48/212* (2013.01); *F21S 48/214* (2013.01); *F21S 48/215* (2013.01); *F21S 48/2212* (2013.01); *H05B 37/0218* (2013.01); *H05B 37/0227* (2013.01); *Y02B 20/46* (2013.01)

(56) References Cited

U.S. PATENT DOCUMENTS

| | | | |
|---|---|---|---|
| 4,852,901 A * | 8/1989 | Beasley | G01B 11/272 280/477 |
| 5,056,905 A | 10/1991 | Jensen | |
| 5,142,278 A | 8/1992 | Moallemi et al. | |
| 5,442,810 A | 8/1995 | Jenquin | |
| 5,455,557 A | 10/1995 | Noll et al. | |
| 5,521,633 A | 5/1996 | Nakajima et al. | |
| 5,709,453 A | 1/1998 | Krent et al. | |
| 5,905,433 A | 5/1999 | Wortham | |
| 5,951,035 A | 9/1999 | Phillips, Jr. et al. | |
| 5,970,619 A | 10/1999 | Wells | |
| 6,100,795 A | 8/2000 | Otterbacher et al. | |
| 6,117,362 A | 9/2000 | Yen et al. | |
| 6,151,175 A | 11/2000 | Osha | |
| 6,178,650 B1 | 1/2001 | Thibodeaux | |
| 6,217,177 B1 | 4/2001 | Rost | |
| 6,318,747 B1 | 11/2001 | Ratican | |
| 6,480,104 B1 | 11/2002 | Wall et al. | |
| 6,577,073 B2 | 6/2003 | Shimizu et al. | |
| 6,729,738 B2 | 5/2004 | Thompson et al. | |
| 6,737,964 B2 | 5/2004 | Samman et al. | |
| 6,773,129 B2 | 8/2004 | Anderson, Jr. et al. | |
| 6,820,888 B1 * | 11/2004 | Griffin | B60D 1/36 116/28 R |
| 6,837,432 B2 | 1/2005 | Tsikos et al. | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,005,974 B2 | 2/2006 | McMahon et al. | |
| 7,008,088 B2 * | 3/2006 | Pisciotti | B60Q 1/305 362/485 |
| 7,036,840 B2 | 5/2006 | Kwilinski | |
| 7,039,504 B2 | 5/2006 | Tanaka et al. | |
| 7,161,472 B2 | 1/2007 | Strumolo et al. | |
| 7,204,504 B2 | 4/2007 | Gehring et al. | |
| 7,213,923 B2 | 5/2007 | Liu et al. | |
| 7,237,790 B2 | 7/2007 | Gehring et al. | |
| 7,264,366 B2 | 9/2007 | Hulse | |
| 7,264,367 B2 | 9/2007 | Hulse | |
| 7,309,075 B2 | 12/2007 | Ramsey et al. | |
| 7,441,914 B2 | 10/2008 | Palmer et al. | |
| 7,568,716 B2 * | 8/2009 | Dietz | B60D 1/36 280/477 |
| 7,619,680 B1 | 11/2009 | Bingle et al. | |
| 7,744,109 B2 | 6/2010 | Groh | |
| 7,745,818 B2 | 6/2010 | Sofue et al. | |
| 7,753,541 B2 | 7/2010 | Chen et al. | |
| 7,760,077 B2 | 7/2010 | Day | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,010,252 B2 | 8/2011 | Getman et al. | |
| 8,016,465 B2 | 9/2011 | Egerer et al. | |
| 8,022,818 B2 | 9/2011 | la Tendresse et al. | |
| 8,038,166 B1 | 10/2011 | Piesinger | |
| 8,044,776 B2 | 10/2011 | Schofield et al. | |
| 8,068,019 B2 | 11/2011 | Bennie et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,165,770 B2 | 4/2012 | Getman et al. | |
| 8,178,852 B2 | 5/2012 | Kingsley et al. | |
| 8,179,238 B2 | 5/2012 | Roberts, Sr. et al. | |
| 8,191,915 B2 | 6/2012 | Freese, V et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,332,097 B2 | 12/2012 | Chiba et al. | |
| 8,362,888 B2 | 1/2013 | Roberts, Sr. et al. | |
| 8,390,696 B2 | 3/2013 | Komoto et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,451,107 B2 | 5/2013 | Lu et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,755,984 B2 | 6/2014 | Rupp et al. | |
| 8,773,012 B2 | 7/2014 | Ryu et al. | |
| 8,836,786 B2 | 9/2014 | Seger et al. | |
| 8,846,184 B2 | 9/2014 | Agrawal et al. | |
| 8,930,140 B2 | 1/2015 | Trombley et al. | |
| 8,952,341 B2 | 2/2015 | Kingsley et al. | |
| 9,042,603 B2 | 5/2015 | Elwart et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 9,315,151 B2 | 4/2016 | Taylor et al. | |
| 9,315,212 B1 | 4/2016 | Kyrtsos et al. | |
| 9,335,162 B2 | 5/2016 | Kyrtsos et al. | |
| 2001/0024333 A1 | 9/2001 | Rost | |
| 2002/0149673 A1 | 10/2002 | Hirama et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2003/0234512 A1 | 12/2003 | Holub | |
| 2004/0207525 A1 | 10/2004 | Wholey et al. | |
| 2004/0213088 A1 | 10/2004 | Fuwausa | |
| 2005/0055139 A1 | 3/2005 | Tanaka et al. | |
| 2005/0074143 A1 | 4/2005 | Kawai | |
| 2005/0128059 A1 | 6/2005 | Vause | |
| 2006/0071447 A1 | 4/2006 | Gehring et al. | |
| 2006/0087826 A1 | 4/2006 | Anderson, Jr. | |
| 2006/0171704 A1 | 8/2006 | Bingle et al. | |
| 2006/0250501 A1 | 11/2006 | Widmann et al. | |
| 2007/0032319 A1 | 2/2007 | Tufte | |
| 2007/0132560 A1 | 6/2007 | Nystrom et al. | |
| 2007/0285808 A1 | 12/2007 | Beale | |
| 2007/0285938 A1 | 12/2007 | Palmer et al. | |
| 2008/0180526 A1 | 7/2008 | Trevino | |
| 2008/0231701 A1 | 9/2008 | Greenwood et al. | |
| 2008/0231707 A1 | 9/2008 | Fontana | |
| 2009/0093928 A1 | 4/2009 | Getman et al. | |
| 2009/0157268 A1 | 6/2009 | Chiba et al. | |
| 2009/0219730 A1 | 9/2009 | Syfert et al. | |
| 2009/0231441 A1 | 9/2009 | Walker et al. | |
| 2009/0251920 A1 | 10/2009 | Kino et al. | |
| 2009/0262515 A1 | 10/2009 | Lee et al. | |
| 2009/0271078 A1 | 10/2009 | Dickinson | |
| 2010/0156667 A1 | 6/2010 | Bennie et al. | |
| 2010/0324770 A1 | 12/2010 | Ramsey et al. | |
| 2011/0012062 A1 | 1/2011 | Agrawal et al. | |

(56) References Cited

U.S. PATENT DOCUMENTS

| | | |
|---|---|---|
| 2011/0018990 A1 | 1/2011 | Komoto et al. |
| 2011/0025482 A1 | 2/2011 | Algueera et al. |
| 2011/0050903 A1 | 3/2011 | Vorobiev |
| 2011/0216199 A1 | 9/2011 | Trevino et al. |
| 2011/0257860 A1 | 10/2011 | Getman et al. |
| 2012/0001406 A1 | 1/2012 | Paxton et al. |
| 2012/0041658 A1 | 2/2012 | Turner |
| 2012/0104954 A1 | 5/2012 | Huang |
| 2012/0183677 A1 | 7/2012 | Agrawal et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0280528 A1 | 11/2012 | Dellock et al. |
| 2012/0288156 A1 | 11/2012 | Kido |
| 2013/0141578 A1 | 6/2013 | Chundrlik, Jr. et al. |
| 2013/0158803 A1 | 6/2013 | Headley |
| 2013/0207834 A1 | 8/2013 | Mizutani et al. |
| 2013/0226390 A1 | 8/2013 | Luo et al. |
| 2013/0268160 A1 | 10/2013 | Trombley et al. |
| 2013/0335994 A1 | 12/2013 | Mulder et al. |
| 2014/0005918 A1 | 1/2014 | Qiang |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0065442 A1 | 3/2014 | Kingsley et al. |
| 2014/0085472 A1 | 3/2014 | Lu et al. |
| 2014/0103258 A1 | 4/2014 | Agrawal et al. |
| 2014/0133170 A1 | 5/2014 | Nave et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0200759 A1 | 7/2014 | Lu et al. |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0264396 A1 | 9/2014 | Lowenthal et al. |
| 2014/0266666 A1 | 9/2014 | Habibi |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0307095 A1 | 10/2014 | Wierich |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0354811 A1 | 12/2014 | Weber |
| 2014/0373898 A1 | 12/2014 | Rogers et al. |
| 2014/0379217 A1 | 12/2014 | Rupp et al. |
| 2015/0046027 A1 | 2/2015 | Sura et al. |
| 2015/0057903 A1 | 2/2015 | Rhode et al. |
| 2015/0066296 A1 | 3/2015 | Trombley et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0138789 A1 | 5/2015 | Singer et al. |
| 2015/0158527 A1 | 6/2015 | Hafner et al. |
| 2015/0172582 A1 | 6/2015 | Kiyohara et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0267881 A1 | 9/2015 | Salter et al. |
| 2015/0269444 A1 | 9/2015 | Lameyre et al. |
| 2016/0016506 A1 | 1/2016 | Collins et al. |
| 2016/0023603 A1 | 1/2016 | Vico et al. |
| 2016/0152263 A1 | 6/2016 | Singh et al. |

FOREIGN PATENT DOCUMENTS

| | | |
|---|---|---|
| CN | 201193011 Y | 2/2009 |
| CN | 101610420 A | 12/2009 |
| DE | 3931518 A1 | 4/1991 |
| DE | 9208595 U1 | 8/1992 |
| DE | 29708699 U1 | 7/1997 |
| DE | 10030738 C1 | 8/2001 |
| DE | 10122562 C1 | 7/2002 |
| DE | 10154612 A1 | 5/2003 |
| DE | 10312548 B3 | 5/2004 |
| DE | 10319396 A1 | 11/2004 |
| DE | 102006056408 A1 | 6/2008 |
| EP | 0418653 A1 | 3/1991 |
| EP | 1312492 A2 | 5/2003 |
| EP | 1793261 A1 | 6/2007 |
| EP | 2644477 A1 | 10/2013 |
| EP | 2778209 A1 | 9/2014 |
| JP | 2000159011 A | 6/2000 |
| JP | 2002012172 A | 1/2002 |
| JP | 2002068032 A | 3/2002 |
| JP | 3716722 B2 | 11/2005 |
| JP | 2007238063 A | 9/2007 |
| JP | 2009171122 A | 7/2009 |
| JP | 2012166647 A | 9/2012 |
| WO | 2006042665 A1 | 4/2006 |
| WO | 2006047306 A1 | 5/2006 |
| WO | 2012103193 A1 | 8/2012 |
| WO | 2013048994 A1 | 4/2013 |
| WO | 2013070539 A1 | 5/2013 |
| WO | 2014068440 A1 | 5/2014 |

OTHER PUBLICATIONS

Alpine Electronics of America, Inc., "Alpine Electronics Introduces Two New Driver Assist Solutions", press release, Jan. 7, 2010, 2 pgs., Torrance, California.

Wagner, M.; Zobel, D.; Meroth, A., "An Adaptive Software and Systems Architecture for Drivers Assistance Systems based on Service Orientation", International Journal of Machine Learning and Computing, Oct. 2011, pp. 359-366, vol. 1, No. 4, Germany.

"Rearview Parking Assist Systems", Donmar Sunroofs & Accessories, Brochure, Aug. 2013, 13 pgs.

"Trailer Vision", Trailer Vision Ltd., Brochure, www.trailervision.co.uk, Date Unknown, 4 pgs.

* cited by examiner

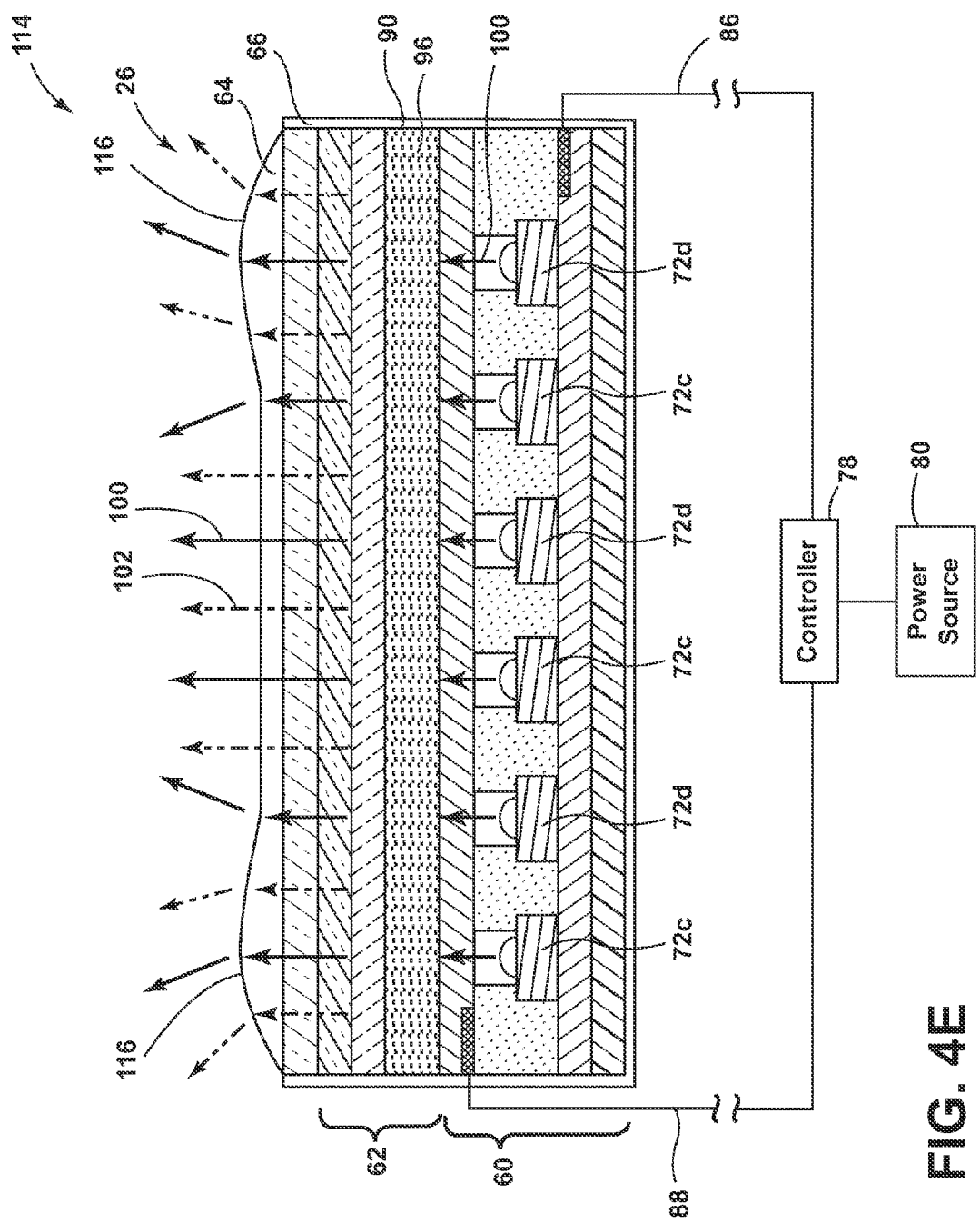

US 9,464,887 B2

ILLUMINATED HITCH ANGLE DETECTION COMPONENT

CROSS-REFERENCE TO RELATED APPLICATIONS

This application is a continuation-in-part of U.S. patent application Ser. No. 14/603,636, filed Jan. 23, 2015, entitled "DOOR ILLUMINATION AND WARNING SYSTEM" which is a continuation-in-part of U.S. patent application Ser. No. 14/086,442, filed Nov. 21, 2013, entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and uniform lighting system. It is therefore desired to implement such structures in automotive vehicles for various lighting applications.

SUMMARY OF THE INVENTION

According to one aspect of the present invention, a lighting system for a trailer is disclosed. The lighting system includes a hitch angle detection component disposed on the trailer. A light source is disposed within the detection component. A photoluminescent structure is disposed on the light source and configured to luminesce in response to excitation by the light source.

According to another aspect of the present invention, a trailer system is disclosed. The trailer system includes a hitch angle detection component having a light source. A first luminescent structure is disposed on the light source and configured to luminesce in response to excitation by at least a portion of the light source.

According to yet another aspect of the present invention, a lighting system for a trailer assembly is disclosed. The lighting system includes a hitch angle detection component having a predefined pattern thereon. A light source is disposed within the hitch angle detection component. A photoluminescent structure is disposed on the light source. The photoluminescent structure is configured to luminesce in response to excitation by light output from at least a portion of the light source.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4E is a cross-sectional view taken along line IV-IV of FIG. 3 illustrating an alternate light source having a luminescent structure disposed on the light source configured to convert a portion of light emitted from the light source from a first wavelength to a second wavelength, according to one embodiment;

DETAILED DESCRIPTION OF THE PREFERRED EMBODIMENTS

Figure 1:
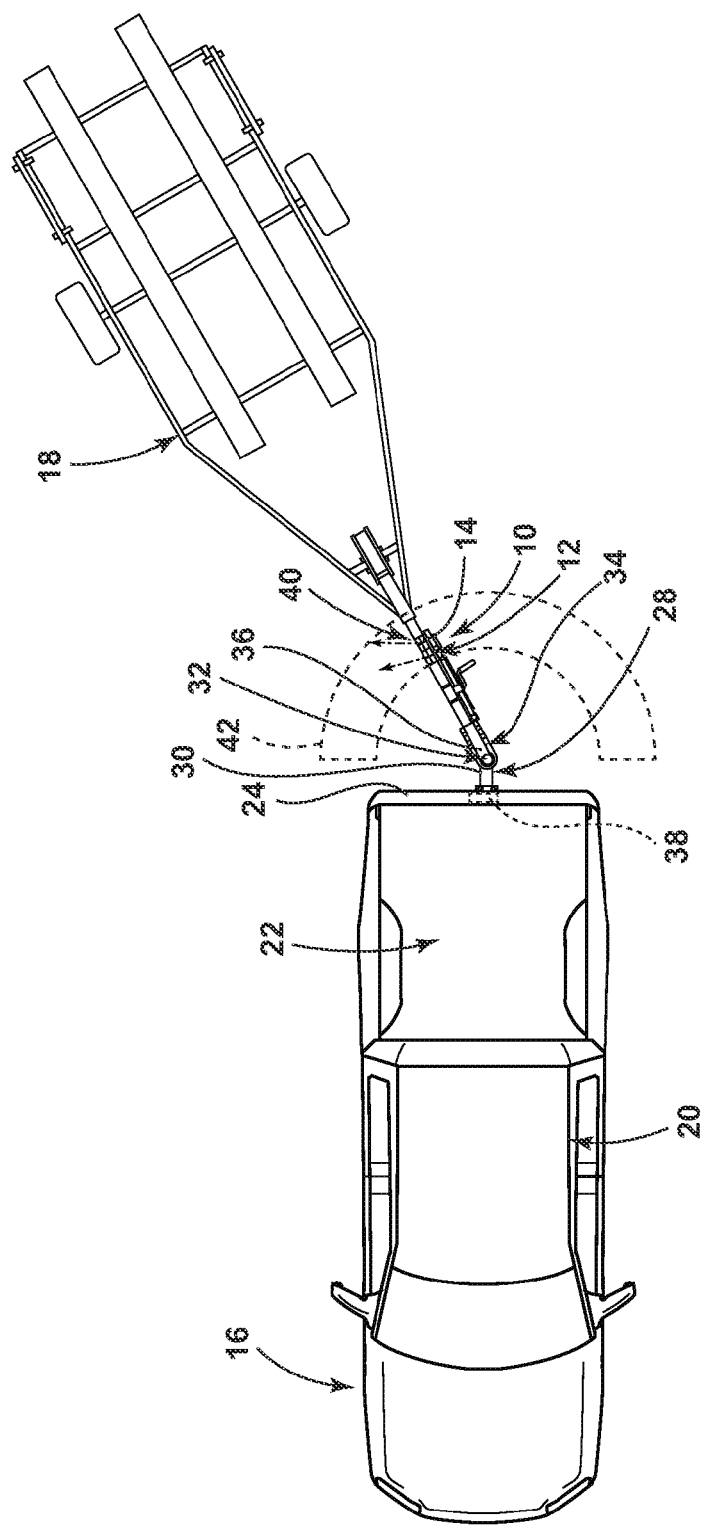
FIG. 1 is a top plan view of a trailer attached to a vehicle equipped with a lighting system employed on a hitch angle detection component, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system configured as a hitch angle detection component that cooperates with a vehicle to illuminate an area and/or in a pre-defined pattern for recognition by the vehicle. The lighting system may advantageously employ one or more photoluminescent structures to illuminate in response to pre-defined events. The one or more photoluminescent structures may be configured to convert light received from an associated light source and re-emit the light at a different wavelength typically found in the visible spectrum. In some embodiments, the light source may implement a thin design, thereby helping to fit the light source into small package spaces of the vehicle where traditional light sources may not be practicable.

Figure 3:
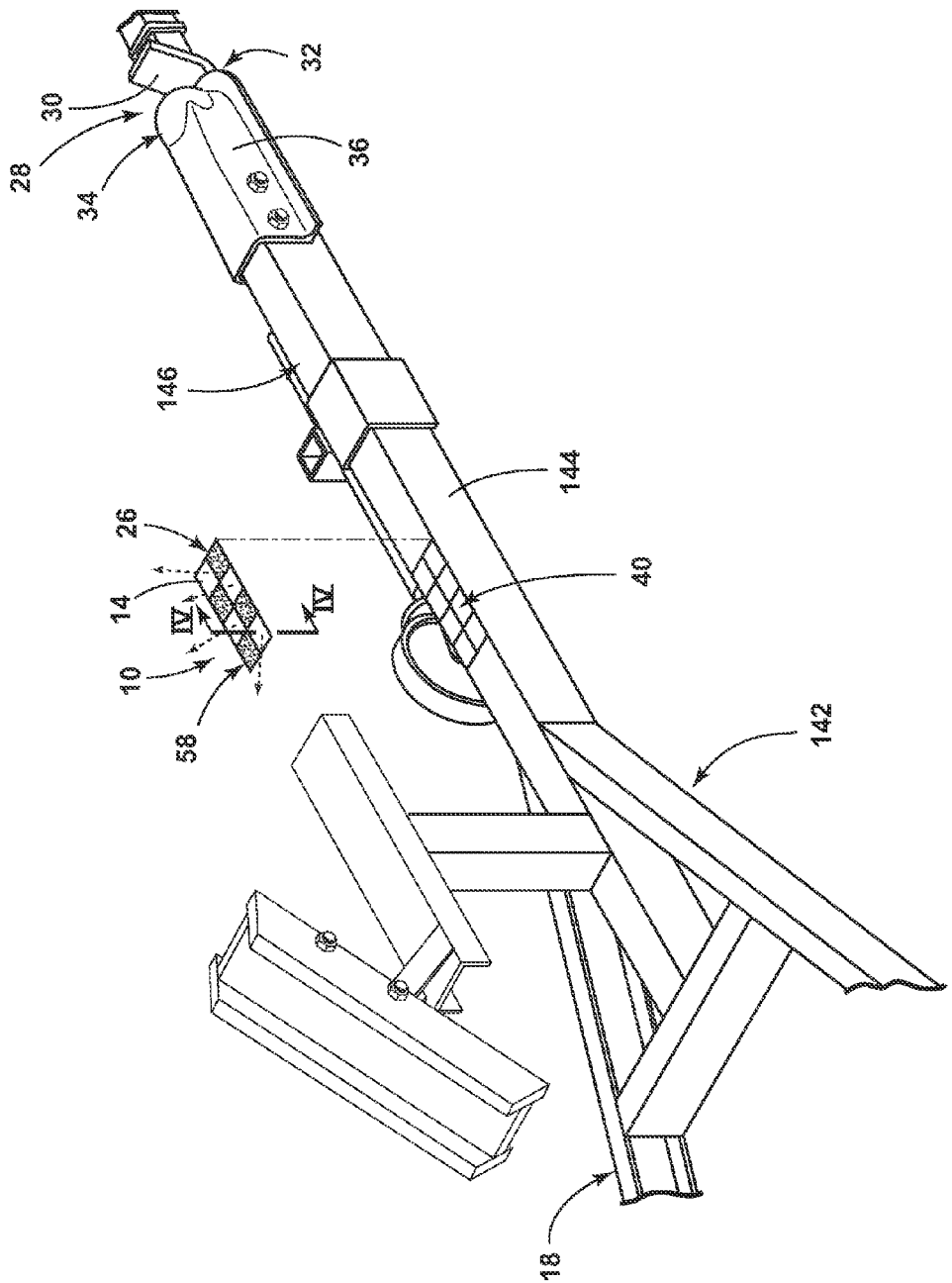
FIG. 3 is an enlarged view of the front portion of the trailer illustrating the hitch angle detection component as an illuminated target assembly.

Referring to FIG. 1, a lighting system 10 is configured as a hitch angle detection component 12, such as an image identification feature that may be configured as a trailer target assembly 14 that cooperates with a vehicle 16 to illuminate an area and/or in a pre-defined pattern, according to one embodiment. The vehicle 16 illustrated is shown towing a trailer 18. The target assembly 14 may be used for a plurality of functions, such as assisting a trailer backup assist system 44 (FIG. 3). Additionally, or alternatively, the target assembly 14 may be utilized for monitoring the trailer 18 while the trailer is towed by the vehicle 16 in a forward or rearward direction. Exemplary functions include, but are not limited to, trailer sway monitoring, tire pressure monitoring, or any other desired function that may be sensed by the vehicle 16. The vehicle 16 is in the form of a pick-up truck having a cab 20 and a truck bed 22. A pivotable tailgate 24 is coupled to a rear portion of the truck bed 22.

The vehicle 16 further includes a vehicle hitch connector 28 in the form of a receiver hitch 30 and ball 32. The trailer 18 has a trailer hitch connector 34 in the form of a coupler assembly 36 that may be connected to the vehicle hitch 30. The coupler assembly 36 latches onto the hitch ball 32 to provide a pivoting ball joint. The vehicle 16 is equipped with a video imaging device (e.g., a camera 38) located in the vehicle tailgate 24 at a rear portion of the vehicle 16. The video imaging camera 38 has imaging field of view and is located and oriented to capture one or more images of the trailer 18 including a region containing one or more desired target placement zone(s) 40. It should be appreciated that one or more cameras 38 may be located at other locations on the vehicle 16 to acquire images of the trailer 18 and the target placement zone(s) 40. The imaging field of the camera 38 may be configured to view a target working envelope 42 that is defined by the full range of possible angles between the trailer 18 and vehicle 16 while the trailer 18 is coupled to the vehicle 16. For example, according to one embodiment, the trailer 18 may be disposed in a range of −90 degrees to 90 degrees from an axis extending the longitudinal centerline of the vehicle 16.

In order to utilize a target assembly 14 on a trailer 18 that is not currently equipped with a suitable pre-existing target assembly 14, a user may place the target assembly 14 onto the trailer 18 within a desired target placement zone 40 so that the camera 38 may capture one or more images of the target assembly 14 to determine trailer related information for the trailer backup assist system 44, such as hitch angle information for the hitch angle detection apparatus 52. It should be appreciated that the lighting system 10 described herein may be utilized for any vehicle 16 such as, but not limited to, coupes, sedans, trucks, sport utility, vans, and the like and may cooperate with any type of towable assembly that may be coupled to the vehicle 16. Further, it should be appreciated that any lighting system 10 found elsewhere on the vehicle 16 may also be manufactured in accordance with the principles of the present disclosure.

Figure 2:
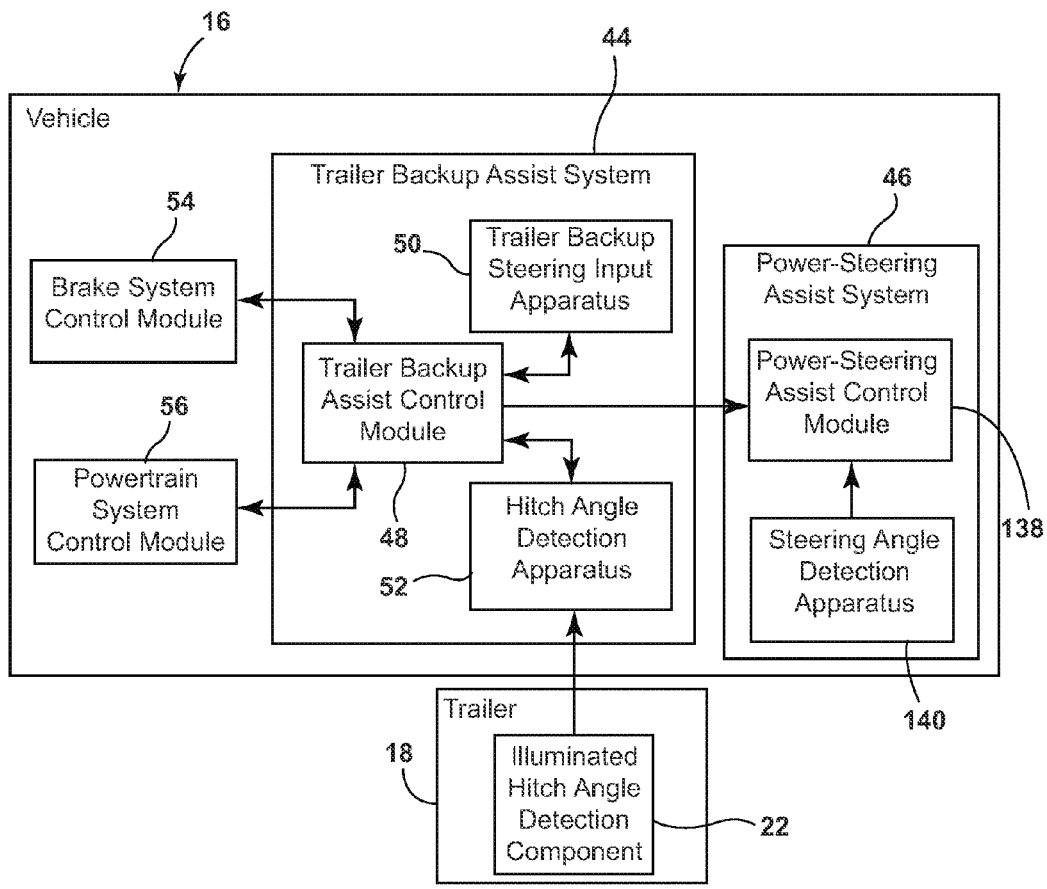
FIG. 2 is a vehicle-trailer combination, the vehicle being configured to perform a trailer backup assist function in accordance with an embodiment.

Referring to FIG. 2, an embodiment of a vehicle 16 configured for performing trailer backup assist functionality is shown. A trailer backup assist system 44 of the vehicle 16 controls the curvature of path of travel of a trailer 18 that is attached to the vehicle 16. Such control is accomplished through interaction of a power-steering assist system 46 of the vehicle 16 and the trailer backup assist system 44.

The trailer backup assist system 44, according to one embodiment, includes a trailer backup assist control module 48, a trailer backup steering input apparatus 50, and a hitch angle detection apparatus 52. The trailer backup assist control module 48 is connected to the trailer backup steering input apparatus 50 and the hitch angle detection apparatus 52 for allowing communication of information therebetween. The trailer backup steering input apparatus 50 may be coupled to the trailer backup assist control module 48 in a wired or wireless manner. The trailer backup assist system control module 48 is attached to a power-steering assist control module 138 of the power-steering assist system 46 for allowing information to be communicated therebetween. A steering angle detection apparatus 140 of the power-steering assist system 46 is connected to the power-steering assist control module 138 for providing information thereto. The trailer backup assist system 44 is also attached to a brake system control module 54 and a powertrain system control module 56 for allowing communication of information therebetween. Jointly, the trailer backup assist system 44, the power-steering assist system 46, the brake system control module 54, the powertrain system control module 56, and a gear selection device (PRNDL), define a trailer backup assist architecture configured in accordance with an embodiment.

The trailer backup assist control module 48 is configured for implementing logic (i.e., instructions) for receiving information from the trailer backup steering input apparatus 50, the hitch angle detection apparatus 52, the power-steering assist control module 138, the brake system control module 54, and the powertrain system control module 56. The trailer backup assist control module 48 (e.g., a trailer curvature algorithm thereof) generates vehicle 16 steering information as a function of all or a portion of the information received from the trailer backup steering input apparatus 50, the hitch angle detection apparatus 52, the power-steering assist control module 138, the brake system control module 54, and/or the powertrain system control module 56. Thereafter, the vehicle 16 steering information is provided to the power-steering assist control module 138 for affecting steering of the vehicle 16 by the power-steering assist system 46 to achieve a commanded path of travel for the trailer 18.

The trailer backup steering input apparatus 50 provides the trailer backup assist control module 48 with information defining the commanded path of travel of the trailer 18 to the trailer backup assist control module 48 (i.e., trailer steering information). The trailer steering information can include information relating to a commanded change in the path of travel (e.g., a change in radius of path curvature) and information relating to an indication that the trailer 18 is to travel along a path defined by a longitudinal centerline axis of the trailer 18 (i.e., along a substantially straight path of travel).

The hitch angle detection apparatus 52, which operates in conjunction with the hitch angle detection component 12 of the trailer 18, provides the trailer backup assist control module 48 with information relating to an angle between the vehicle 16 and the trailer 18 (i.e., hitch angle information). In one embodiment, the hitch angle detection apparatus 52 is a camera-based apparatus such as, for example, an existing rear view camera 38 of the vehicle 16 that images (i.e., visually monitors) the target assembly 14 (i.e., the hitch angle detection component 12) attached the trailer 18 as the trailer 18 is being backed by the vehicle 16. The hitch angle detection component 12 may be a dedicated component (e.g., an item attached to/integral with a surface of the trailer 18 for the express purpose of being recognized by the hitch angle detection apparatus 52). The hitch angle detection apparatus 52 can be configured for detecting a jackknife enabling condition and/or related information (e.g., when a hitch angle threshold has been met).

The power-steering assist control module 138 provides the trailer backup assist control module 48 with information relating to a rotational position (e.g., angle) of the steering wheel angle and/or a rotational position (e.g., turning angle(s)) of steered wheels of the vehicle 16. In some embodiments, the trailer backup assist control module 48 can be an integrated component of the power-steering assist system 46. For example, the power-steering assist control module 138 can include a trailer backup assist algorithm for generating vehicle 16 steering information as a function of all or a portion of information received from the trailer backup steering input apparatus 50, the hitch angle detection apparatus 52, the power-steering assist control module 138, the brake system control module 54, and the powertrain system control module 56.

The brake system control module 54 provides the trailer backup assist control module 48 with information relating to vehicle speed. Such vehicle speed information can be determined from individual wheel speeds as monitored by the brake system control module 54 or may be provided by an engine control module with signal plausibility. Vehicle speed may also be determined from an engine control module. In some instances, individual wheel speeds can also be used to determine a vehicle 16 yaw rate and such yaw rate can be provided to the trailer backup assist control module 48 for use in determining the vehicle 16 steering information. In certain embodiments, the trailer backup assist control module 48 can provide vehicle 16 braking information to the brake system control module 54 for allowing the trailer backup assist control module 48 to control braking of the vehicle 16 during backing of the trailer 18. For example, using the trailer backup assist control module 48 to regulate speed of the vehicle 16 during backing of the trailer 18 can reduce the potential for unacceptable trailer backup conditions. Examples of unacceptable trailer backup conditions include, but are not limited to, a vehicle over speed condition, a high hitch angle rate, trailer angle dynamic instability, a calculated theoretical trailer jackknife condition (defined by a maximum vehicle steering angle, drawbar length, tow vehicle wheelbase and an effective trailer length), or physical contact jackknife limitation (defined by an angular displacement limit relative to the vehicle 16 and the trailer 18), and the like.

The powertrain system control module 56 interacts with the trailer backup assist control module 48 for regulating speed and acceleration of the vehicle 16 during backing of the trailer 18. Regulation of the speed of the vehicle 16 is necessary to limit the potential for unacceptable trailer backup conditions such as, for example, jackknifing and trailer angle dynamic instability.

Referring to FIG. 3, a front portion of a trailer 18 is shown having a frame 142 including a longitudinally extending bar or trailer tongue 144. A top horizontal surface 146 of trailer tongue 144 is shown providing a target placement zone 40 for receiving the target assembly 14. It should be appreciated that the trailer 18 may be configured in various shapes and sizes and may offer one or more other suitable target placement zones 40 for receiving the target assembly 14. The target placement zone 40 defines at least one desired location for placement of the target assembly 14.

The target assembly 14 may include an adhesive on the bottom surface and a predetermined image pattern of a certain size and shape provided on the top surface for capture by the video camera 38 and recognition by the image processing. The target assembly 14 may have a rectangular shape, according to one embodiment, and may have a camera image recognizable pattern such as the checker pattern 58 shown. The image processing may include known image pattern recognition routines 194 (FIG. 8) for identifying a target pattern 58 and its location on a trailer 18. However, it should be appreciated that other target assembly 14 shapes, sizes, and patterns may be employed. It should further be appreciated that the target assembly 14 may otherwise be connected to the trailer 18 using connectors, such as fasteners, which may connect to the trailer 18 or to an attachment to the trailer 18. It should further be appreciated that the target assembly 14 can be attached via magnet, glued on, painted on, or any number of other suitable means.

A light source 26 may be disposed on and/or within the hitch angle detection component 12 (e.g., the target assembly 14). The light source 26 may comprise any form of light source. For example fluorescent lighting, light emitting diodes (LEDs), organic LEDs (OLEDs), polymer LEDs (PLEDs), solid state lighting, or any other form of lighting configured to output the first emission may be utilized. As illustrated, the light source 26 is disposed on the trailer tongue 144 of the trailer 18 and is oriented to emit light upwardly and/or forwardly towards the vehicle 16. According to one embodiment, the light source 26 includes a flexible circuit board (e.g., a copper flexible circuit) that is coupled to, attached to, or disposed under a portion of the checker pattern 58. In such an arrangement, the flexible circuit board may flex in conjunction with the trailer 18 to allow the lighting system 10 to be contoured with any desired trailer 18 and/or a plurality of target placement zones 40.

A photoluminescent structure 62 may be applied or otherwise arranged on and/or proximate the light source 26. One or more light sources 26 may be disposed within the lighting system 10 and configured to emit light towards a target assembly 14 location. More specifically, light emitted from the light source 26 towards the target assembly 14 location may be converted by the photoluminescent structure 62 and re-emitted as light having a different wavelength, typically in the visible spectrum. According to the illustrated embodiment, the target assembly 14 location is an area disposed proximate to the vehicle 16. It is contemplated that the lighting system 10 may have a wide range of target assembly 14 locations such that the lighting system 10 may be used for a plurality of functions. Exemplary functions include usage as a target, ambient lighting, and/or a lamp that provides illumination to an area proximate the trailer hitch connector 34.

The light source 26 may be over molded, or otherwise attached, to a decorative layer 98, that may have a pattern 58 thereon that is recognizable by the camera 38. According to one embodiment, the decorative layer 98 and the light source 26 are placed in a mold simultaneously and an overmold material 66 is disposed over the combination of the decorative layer 98 and the light source 26. In embodiments where the overmold material 66 is cured under pressure, the overmold material 66 may be applied to the decorative layer 98 in a partly-cured condition. In one embodiment, the over molding process includes applying the overmold material 66 onto at least a part of the combination of the decorative layer 98 and light source 26 by spraying, brushing, dipping, printing, laminating or rolling, followed by curing the overmold material 66. Such a process results in the decorative layer 98 and light source 26 being coupled to one another. In some embodiments, the overmold material 66 may include a polymeric material, silicon, urethane material, vinyl, and/or any other material that may be advantageous or structurally sound for placement within a zone that regularly is regularly contacted and prone to environmental debris. Moreover, in some embodiments, the overmold material 66 may be transparent or translucent and may provide light diffusing and/or anti-glare characteristics. It should be appreciated that the overmold material 66 may be disposed over any and/or all components of the lighting system 10 such that the overmold material 66 may encapsulate all of the components into a single piece that may be applied, attached, or otherwise coupled to the desired target zone 40.

Figure 4A:
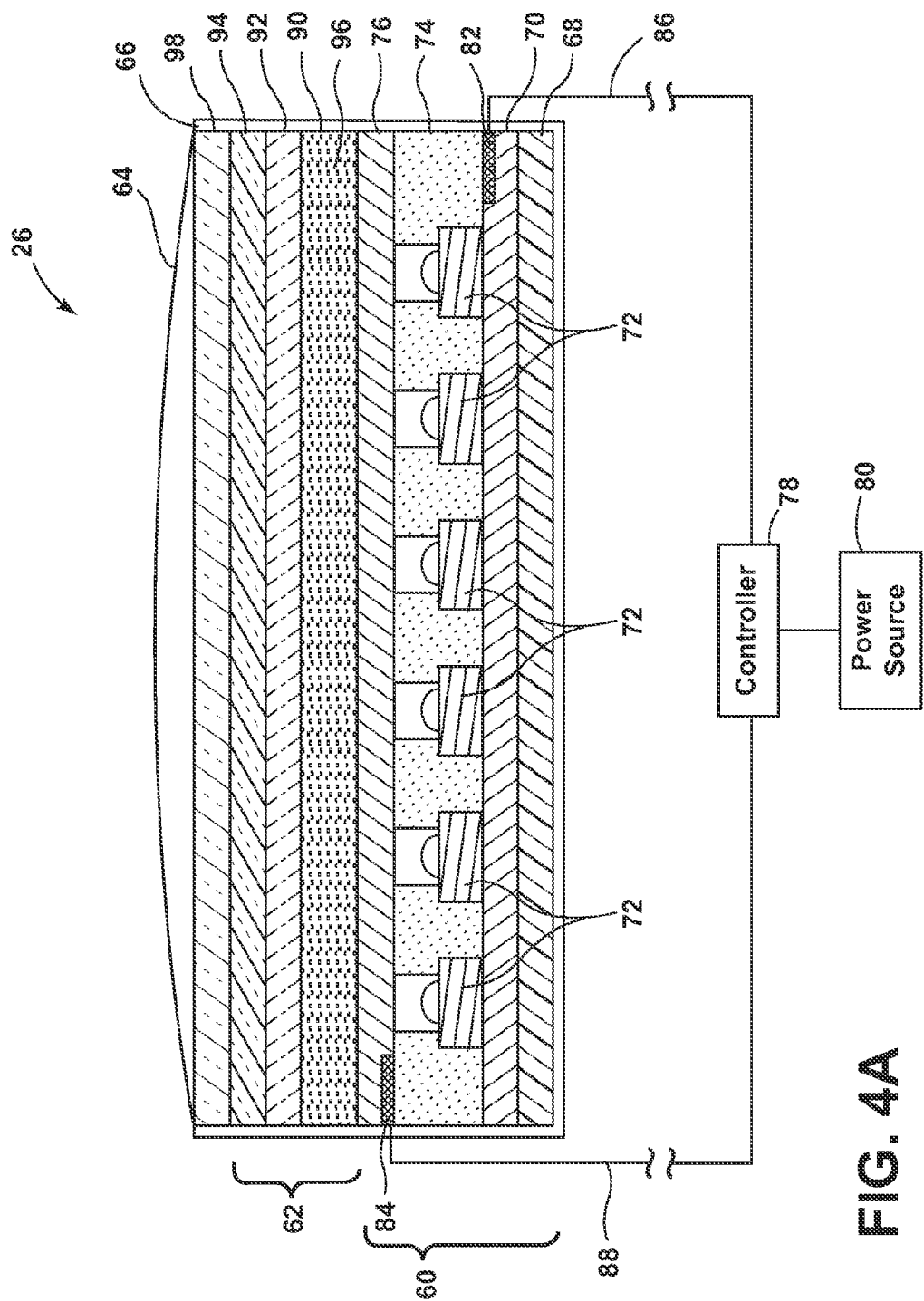
FIG. 4A is a cross-sectional view taken along line IV-IV of FIG. 3 illustrating a light source according to one embodiment.

Referring to FIGS. 4A-4E, a cross-sectional view of the light source 26 having an external photoluminescent structure 62 is shown according to one embodiment. As illustrated in FIG. 4A, the light source 26 may have a stacked arrangement that includes a light-producing assembly 60, a photoluminescent structure 62, a viewable portion 64, and an overmold material 66. It should be appreciated that the viewable portion 64 and the overmold material 66 may be two separate components, or may be integrally formed as a single component.

The light-producing assembly 60 may correspond to a thin-film or printed light emitting diode (LED) assembly and includes a base member 68 as its lowermost layer. The base member 68 may include a polycarbonate, poly-methyl methacrylate (PMMA), or polyethylene terephthalate (PET) material, or any other material known in the art, on the order of 0.005 to 0.060 inches thick and is arranged over the intended vehicle surface on which the light source 26 is to be received (e.g., the trailer tongue 144).

The light-producing assembly 60 includes a positive electrode 70 arranged over the base member 68. The positive electrode 70 includes a conductive epoxy such as, but not limited to, a silver-containing or copper-containing epoxy. The positive electrode 70 is electrically connected to at least a portion of a plurality of LED sources 72 arranged within a semiconductor ink 74 and applied over the positive electrode 70. Likewise, a negative electrode 76 is also electrically connected to at least a portion of the LED sources 72. The negative electrode 76 is arranged over the semiconductor ink 74 and includes a transparent or translucent conductive material such as, but not limited to, indium tin oxide. Additionally, each of the positive and negative electrodes 70, 76 are electrically connected to a controller 78 and a power source 80 via a corresponding bus bar 82, 84 and conductive leads 86, 88. The bus bars 82, 84 may be printed along opposite edges of the positive and negative electrodes 70, 76 and the points of connection between the bus bars 82, 84 and the conductive leads 86, 88 may be at opposite corners of each bus bar 82, 84 to promote uniform current distribution along the bus bars 82, 84. It should be appreciated that in alternate embodiments, the orientation of components within the light-producing assembly 60 may be altered without departing from the concepts of the present disclosure. For example, the negative electrode 76 may be disposed below the semiconductor ink 74 and the positive electrode 70 may be arranged over the aforementioned semiconductor ink 74. Likewise, additional components, such as the bus bars 82, 84 may also be placed in any orientation such that the light-producing assembly 60 may emit inputted light 100 (FIG. 4B) towards a desired location.

The LED sources 72 may be dispersed in a random or controlled fashion within the semiconductor ink 74 and may be configured to emit focused or non-focused light toward the photoluminescent structure 62. The LED sources 72 may correspond to micro-LEDs of gallium nitride elements on the order of about 5 to about 400 microns in size and the semiconductor ink 74 may include various binders and dielectric material including, but not limited to, one or more of gallium, indium, silicon carbide, phosphorous, and/or translucent polymeric binders.

The semiconductor ink 74 can be applied through various printing processes, including ink jet and silk screen processes to selected portion(s) of the positive electrode 70. More specifically, it is envisioned that the LED sources 72 are dispersed within the semiconductor ink 74, and shaped and sized such that a substantial quantity of the LED sources 72 align with the positive and negative electrodes 70, 76 during deposition of the semiconductor ink 74. The portion of the LED sources 72 that ultimately are electrically connected to the positive and negative electrodes 70, 76 may be illuminated by a combination of the bus bars 82, 84, controller 78, power source 80, and conductive leads 86, 88. According to one embodiment, the power source 80 may correspond to a vehicular power source 80 operating at 12 to 16 VDC. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

Referring still to FIG. 4A, the photoluminescent structure 62 is arranged over the negative electrode 76 as a coating, layer, film or other suitable deposition. With respect to the presently illustrated embodiment, the photoluminescent structure 62 may be arranged as a multi-layered structure including an energy conversion layer 90, optional stability layer 92, and optional protection layer 94.

The energy conversion layer 90 includes at least one photoluminescent material 96 having energy converting elements with phosphorescent or fluorescent properties. For example, the photoluminescent material 96 may include organic or inorganic fluorescent dyes including rylenes, xanthenes, porphyrins, and phthalocyanines. Additionally, or alternatively, the photoluminescent material 96 may include phosphors from the group of Ce-doped garnets such as YAG:Ce. The energy conversion layer 90 may be prepared by dispersing the photoluminescent material 96 in a polymer matrix to form a homogenous mixture using a variety of methods. Such methods may include preparing the energy conversion layer 90 from a formulation in a liquid carrier medium and coating the energy conversion layer 90 to the negative electrode 76 or other desired base member 68. The energy conversion layer 90 may be applied to the negative electrode 76 by painting, screen printing, flexography, spraying, slot coating, dip coating, roller coating, bar coating, and/or any other methods known in the art. Alternatively, the energy conversion layer 90 may be prepared by methods that do not use a liquid carrier medium. For example, the energy conversion layer 90 may be rendered by dispersing the photoluminescent material 96 into a solid state solution (homogenous mixture in a dry state) that may be incorporated in a polymer matrix formed by extrusion, injection seal, compression seal, calendaring, thermoforming, etc.

To protect the photoluminescent material 96 contained within the energy conversion layer 90 from photolytic and thermal degradation, the photoluminescent structure 62 may include the stability layer 92. The stability layer 92 may be configured as a separate layer optically coupled and adhered to the energy conversion layer 90 or otherwise integrated therewith. The photoluminescent structure 62 may also include the protection layer 94 optically coupled and adhered to the stability layer 92 or other layer (e.g., the energy conversion layer 90 in the absence of the stability layer 92) to protect the photoluminescent structure 62 from physical and chemical damage arising from environmental exposure. The stability layer 92 and/or the protection layer 94 may be combined with the energy conversion layer 90 through sequential coating or printing of each layer, sequential lamination or embossing, or any other suitable means. Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In operation, the photoluminescent material 96 is formulated to become excited upon receiving inputted light 100 (FIG. 4B) of a specific wavelength from at least a portion of the LED sources 72 of the light-producing assembly 60. As a result, the inputted light 100 undergoes an energy conversion process and is re-emitted at a different wavelength. According to one embodiment, the photoluminescent material 96 may be formulated to convert inputted light 100 into a longer wavelength light, otherwise known as down conversion. Alternatively, the photoluminescent material 96 may be formulated to convert inputted light 100 into a shorter wavelength light, otherwise known as up conversion. Under either approach, light converted by the photoluminescent material 96 may be immediately outputted 102 (FIG. 4B) from the photoluminescent structure 62 or otherwise used in an energy cascade, wherein the converted light serves as inputted light to excite another formulation of photoluminescent material 96 located within the energy conversion layer 90, whereby the subsequent converted light may then be outputted from the photoluminescent structure 62 or used as inputted light, and so on. With respect to the energy conversion processes described herein, the difference in wavelength between the inputted light 100 and the converted outputted light 102 is known as the Stokes shift and serves as the principle driving mechanism for an energy conversion process corresponding to a change in wavelength of light.

With continued reference to FIG. 4A, the viewable portion 64 is arranged over the photoluminescent structure 62. In some embodiments, the viewable portion 64 may include a plastic, silicon, or urethane material and is molded over the photoluminescent structure 62 and light-producing assembly 60. Preferably, the viewable portion 64 should be at least partially light transmissible. In this manner, the viewable portion 64 will be illuminated by the photoluminescent structure 62 whenever an energy conversion process is underway. Additionally, by over-sealing the viewable portion 64, it may also function to protect the photoluminescent structure 62 and the light-producing assembly 60. The viewable portion 64 may be arranged in a planar shape and/or an arcuate shape to enhance its viewing potential when in a luminescent state. Like the photoluminescent structure 62 and the light-producing assembly 60, the viewable portion 64 may also benefit from a thin design, thereby helping to fit the light source 26 into small package spaces of the vehicle 16.

In some embodiments, a decorative layer 98 may be disposed between the viewable portion 64 and the photoluminescent structure 62. The decorative layer 98 may include a polymeric material or other suitable material and is configured to control or modify an appearance of the viewable portion 64 of the light source 26. For example, the decorative layer 98 may be configured to confer a checker pattern 58 such that the target assembly 14 is easily identified by a camera 38. In other embodiments, the decorative layer 98 may be tinted any color to complement the structure on which the light source 26 is to be received, or may contain any other indicia thereon and/or therein such that the camera 38 may identify the indicia during a trailer backup assist function.

The overmold material 66 is disposed around the light-producing assembly 60 and photoluminescent structure 62 and may be formed integrally with the viewable portion 64. The overmold material 66 may protect the light-producing assembly 60 from a physical and chemical damage arising from environmental exposure. The overmold material 66 may have viscoelasticity (i.e., having both viscosity and elasticity), a low Young's modulus, and/or a high failure strain compared with other materials so that the overmold material 66 may protect the light-producing assembly 60 when contact is made thereto. For example, the overmold material 66 may protect the light-producing assembly 60 from the repetitive contact that may occur when the occupants utilize the lighting system 10 described herein.

In some embodiments, the photoluminescent structure 62 may be employed separate and away from the light-producing assembly 60. For example, the photoluminescent structure 62 may be positioned on a vehicle 16 and/or trailer component or surface proximate thereto, but not in physical contact with the light-producing assembly 60, as will be described in more detail below. It should be understood that in embodiments where the photoluminescent structure 62 is incorporated into distinct components separated from the light source 26, the light source 26 may still have the same or similar structure to the light source 26 described in reference to FIG. 4A.

Figure 4B:
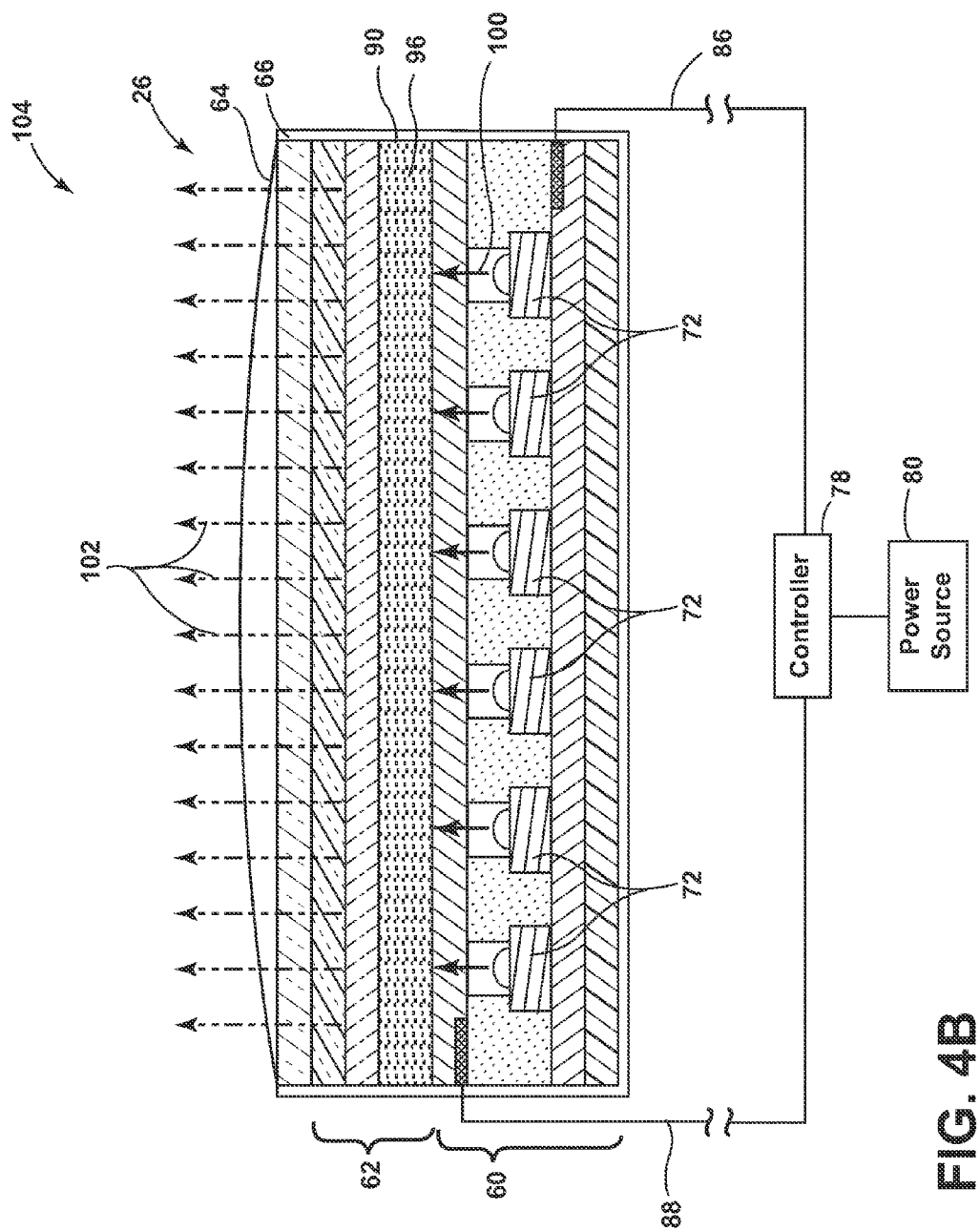
FIG. 4B is a cross-sectional view taken along line IV-IV of FIG. 3 further illustrating the light source, according to one embodiment.

Referring to FIG. 4B, an energy conversion process 104 for producing single color luminescence is illustrated according to one embodiment. For purposes of illustration, the energy conversion process 104 is described below using the light source 26 depicted in FIG. 4A. In this embodiment, the energy conversion layer 90 of the photoluminescent structure 62 includes a single photoluminescent material 96, which is configured to convert inputted light 100 received from LED sources 72 into an outputted light 102 having a wavelength different than that associated with the inputted light 100. More specifically, the photoluminescent material 96 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application. The converted visible outputted light 102 is emitted from the light source 26 via the viewable portion 64, thereby causing the viewable portion 64 to illuminate in the desired color. In one embodiment, the energy conversion process 104 is undertaken by way of down conversion, whereby the inputted light 100 includes light on the lower end of the visibility spectrum such as blue, violet, or ultraviolet (UV) light. Doing so enables blue, violet, or UV LEDs to be used as the LED sources 72, which may offer a relative cost advantage over simply using LEDs of the desired color and foregoing the energy conversion, process altogether. Furthermore, the illumination provided by the viewable portion 64 may offer a unique, substantially uniform, and/or attractive viewing experience that may be difficult to duplicate through non-photoluminescent means.

Figure 4C:
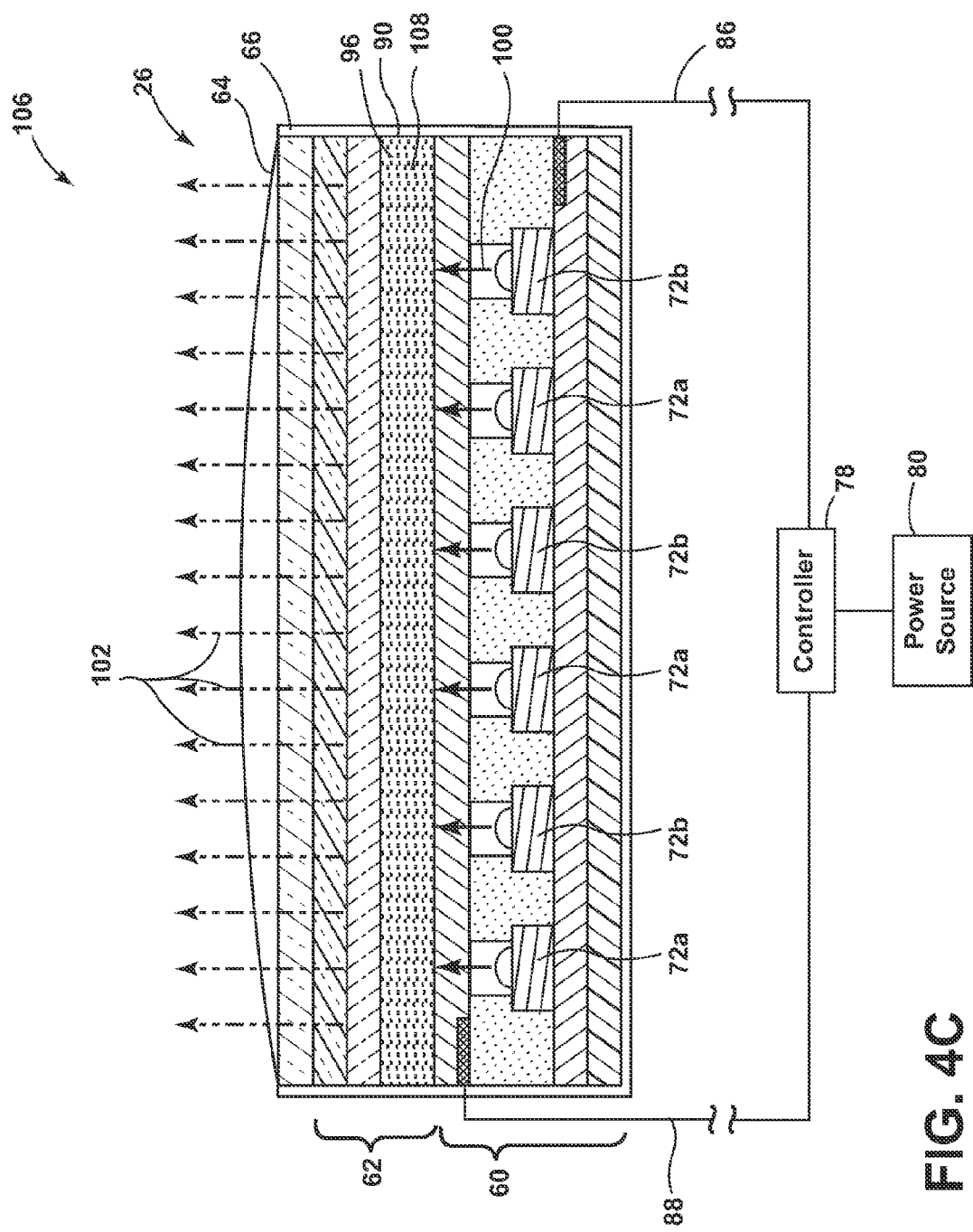
FIG. 4C is a cross-sectional view taken along line IV-IV of FIG. 3 illustrating an alternate light source, according to one embodiment.

Referring to FIG. 4C, a second energy conversion process 106 for generating multiple colors of light is illustrated according to one embodiment. For consistency, the second energy conversion process 106 is also described below using the light source 26 depicted in FIG. 4A. In this embodiment, the energy conversion layer 90 includes the first and second photoluminescent materials 96, 108 that are interspersed within the energy conversion layer 90. Alternatively, the photoluminescent materials 96, 108 may be isolated from each other if desired. Also, it should be appreciated that the energy conversion layer 90 may include more than two different photoluminescent materials 96, 108, in which case, the concepts provided herein similarly apply. In one embodiment, the second energy conversion process 106 occurs by way of down conversion using blue, violet, and/or UV light as the source of excitation.

With respect to the presently illustrated embodiment, the excitation of photoluminescent materials 96, 108 is mutually exclusive. That is, photoluminescent materials 96, 108 are formulated to have non-overlapping absorption spectrums and Stoke shifts that yield different emission spectrums. Also, in formulating the photoluminescent materials 96, 108, care should be taken in choosing the associated Stoke shifts such that the converted outputted light 102 emitted from one of the photoluminescent materials 96, 108, does not excite the other, unless so desired. According to one exemplary embodiment, a first portion of the LED sources 72, exemplarily shown as LED sources 72a, is configured to emit an inputted light 100 having an emission wavelength that only excites photoluminescent material 96 and results in the inputted light 100 being converted into a visible light outputted 102 of a first color (e.g., white). Likewise, a second portion of the LED sources 72, exemplarily shown as LED sources 72b, is configured to emit an inputted light 100 having an emission wavelength that only excites second photoluminescent material 108 and results in the inputted light 100 being converted into a visible outputted light 102 of a second color (e.g., red). Preferably, the first and second colors are visually distinguishable from one another. In this manner, LED sources 72a and 72b may be selectively activated using the controller 78 to cause the photoluminescent structure 62 to luminesce in a variety of colors. For example, the controller 78 may activate only LED sources 72a to exclusively excite photoluminescent material 96, resulting in the viewable portion 64 illuminating in the first color. Alternatively, the controller 78 may activate only LED sources 72b to exclusively excite the second photoluminescent material 108, resulting in the viewable portion 64 illuminating in the second color.

Alternatively still, the controller 78 may activate LED sources 72a and 72b in concert, which causes both of the photoluminescent materials 96, 108 to become excited, resulting in the viewable portion 64 illuminating in a third color, which is a color mixture of the first and second color (e.g., pinkish). The intensities of the inputted light 100 emitted from each LED sources 72a, 72d may also be proportionally varied to one another such that additional colors may be obtained. For energy conversion layers 90 containing more than two distinct photoluminescent materials 96, 108, a greater diversity of colors may be achieved. Contemplated colors include red, green, blue, and combinations thereof, including white, all of which may be achieved by selecting the appropriate photoluminescent materials and correctly manipulating their corresponding LED sources 72.

Figure 4D:
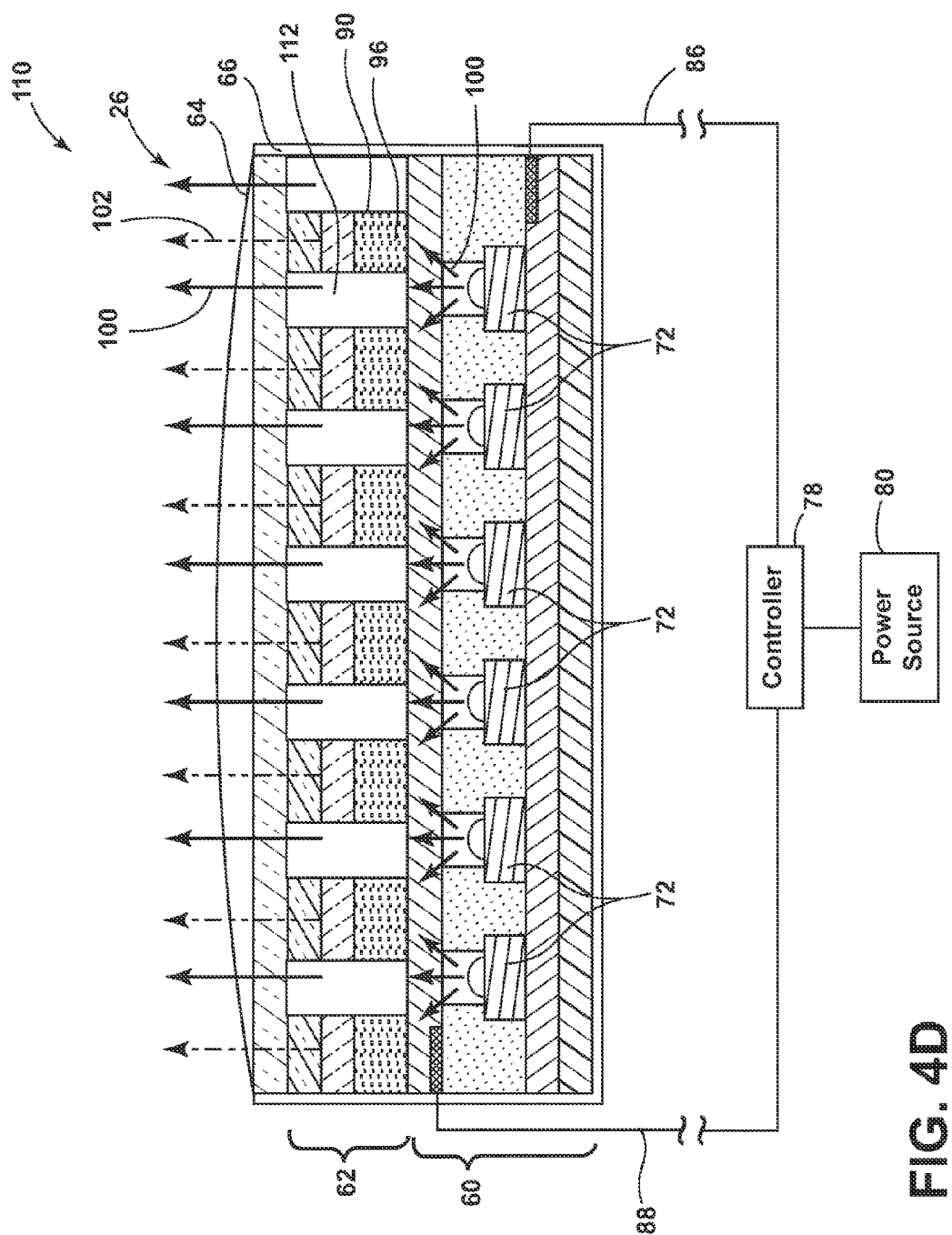
FIG. 4D is a cross-sectional view taken along line IV-IV of FIG. 3 illustrating a light source having a luminescent structure separated by light transmissive portions disposed on the light source, according to one embodiment.

Referring to FIG. 4D, a third energy conversion process 1 includes a light-producing assembly 60, such as the one described in reference to FIG. 4A, and a photoluminescent structure 62 disposed thereon is illustrated, according to an alternate embodiment. The photoluminescent structure 62 is configured to convert inputted light 100 received from LED sources 72 into a visible outputted light 102 having a wavelength different than that associated with the inputted light 100. More specifically, the photoluminescent structure 62 is formulated to have an absorption spectrum that includes the emission wavelength of the inputted light 100 supplied from the LED sources 72. The photoluminescent material 96 is also formulated to have a Stokes shift resulting in the converted visible outputted light 102 having an emission spectrum expressed in a desired color, which may vary per lighting application.

The photoluminescent structure 62 may be applied to only a portion of the light-producing assembly 60, for example, in a stripped manner. Between the photoluminescent structures 62 may be light transmissive portions 112 that allow inputted light 100 emitted from the LED sources 72 to pass therethrough at the first wavelength. The light transmissive portions 112 may be an open space, or may be a transparent or translucent material. The inputted light 100 emitted through the light transmissive portions 112 may be directed from the light-producing assembly 60 towards a second photoluminescent structure 132 (FIG. 5) disposed proximate to the light-producing assembly 60. The second photoluminescent structure 132 may be configured to luminesce in response to the inputted light 100 that is directed through the light transmissive portions 112.

Referring to FIG. 4E, a fourth energy conversion process 114 for generating multiple colors of light utilizing the light-producing assembly 60, such as the one described in reference to FIG. 4A, and a photoluminescent structure 62 disposed thereon is illustrated. In this embodiment, the photoluminescent structure 62 is disposed over a top portion of the light-producing assembly 60. The excitation of photoluminescent material 96 is formulated such that a portion of inputted light 100 emitted from the LED sources 72 passes through the photoluminescent structure 62 at the first wavelength (i.e., the inputted light 100 emitted from the LED sources 72 is not converted by the photoluminescent structure 62). The intensity of the emitted inputted light 100 may be modified by pulse-width modulation or current control to vary the amount of inputted light 100 emitted from the LED sources 72 that passes through the photoluminescent structure 62 without converting to a second, outputted 102 wavelength. For example, if the light source 26 is configured to emit inputted light 100 at a low level, substantially all of the inputted light 100 may be converted to the second wavelength of outputted light 102. In this configuration, a color of outputted light 102 corresponding to the photoluminescent structure 62 may be emitted from the light-producing assembly 60. If the light source 26 is configured to emit inputted light 100 at a high level, only a portion of the first wavelength may be converted by the photoluminescent structure 62. In this configuration, a first portion of the inputted light 100 may be converted by the photoluminescent structure 62 and a second portion of the inputted light 100 may be emitted from the light-producing assembly 60 at the first wavelength towards additional photoluminescent structures 132 disposed proximately to the light source 26. The additional photoluminescent structures 132 may luminesce in response to the inputted light 100 emitted from the light source 26.

According to one exemplary embodiment, a first portion of the LED sources 72a is configured to emit an inputted light 100 having a wavelength that excites the photoluminescent material 96 within the photoluminescent structure 62 and results in the inputted light 100 being converted into a visible outputted light 102 of a first color (e.g., white). Likewise, a second portion of the LED sources 72c is configured to emit an inputted light 100 having a wavelength that passes through the photoluminescent structure 62 and excites additional photoluminescent structures 132 disposed proximately to the lighting system 10 thereby illuminating in a second color. The first and second colors may be visually distinguishable from one another. In this manner, LED sources 72a and 72c may be selectively activated using the controller 78 to cause the lighting system 10 to luminesce in a variety of colors.

The light-producing assembly 60 may also include optics 116 that are configured to direct inputted light 100 emitted from the LED sources 72a, 72c and the outputted light 102 emitted from the photoluminescent structure 62 towards pre-defined locations. For example, the inputted light 100 emitted from the LED sources 72a, 72c and the photoluminescent structure 62 may be directed and/or focused towards a desired feature 178 (FIG. 7) and/or location proximate to the light source 26.

Figure 5:
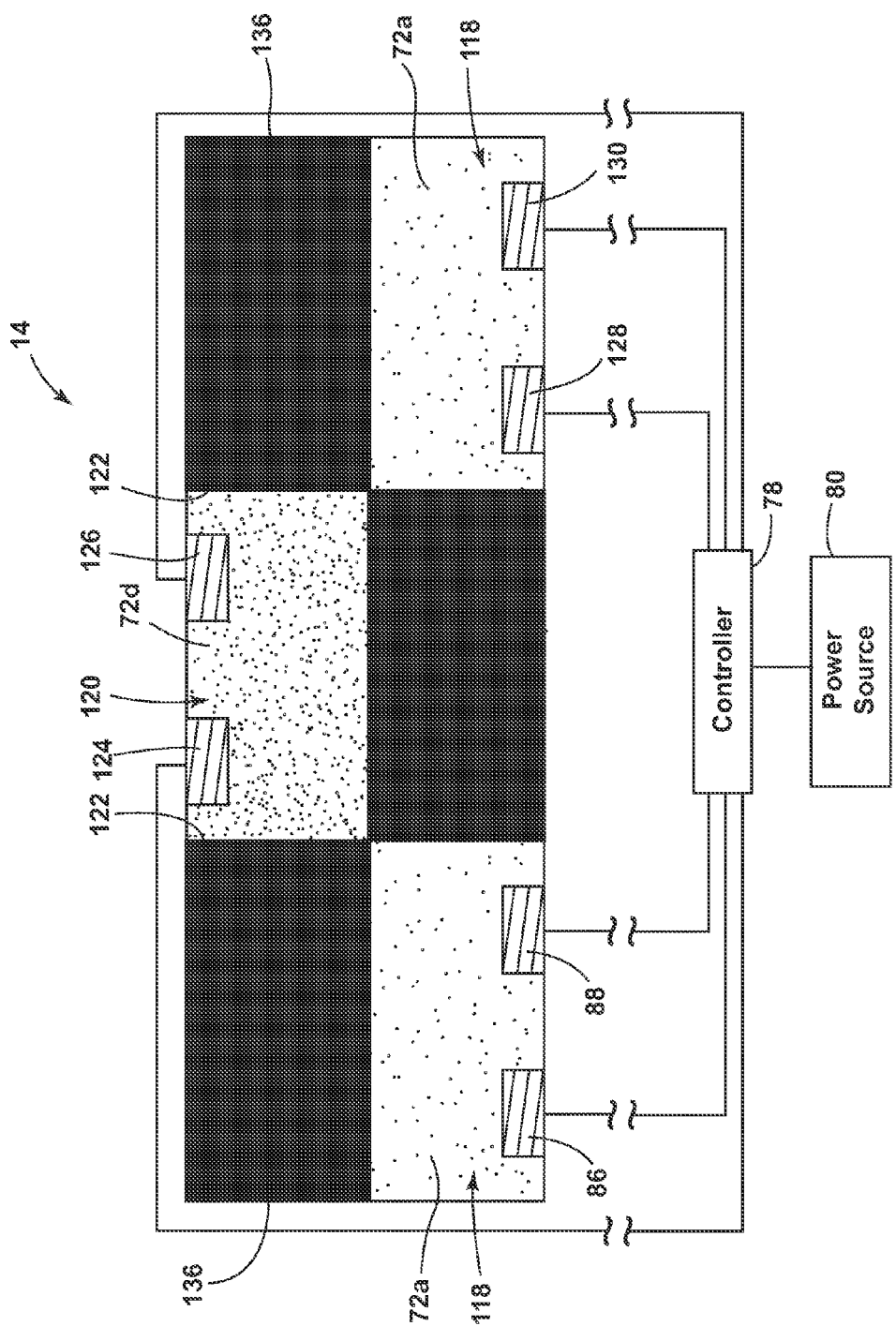
FIG. 5 illustrates a top view of a light-producing assembly, according to one embodiment, having varying types and concentrations of LED sources transversely along the light-producing assembly.

Referring to FIG. 5, a light-producing assembly 60, according to one embodiment, is illustrated from a top view having varying types and concentrations of LED sources 72a, 72d transversely along the light-producing assembly 60. As illustrated, a first portion 118 of the light-producing assembly 60 includes LED sources 72a that are configured to emit an inputted light 100 having an emission wavelength in a first color (e.g., white) spectrum. Likewise, a second portion 120 of the light-producing assembly 60 includes LED sources 72d that are configured to emit an inputted light 100 having an emission wavelength in a second color (e.g., red) spectrum. However, it should be appreciated that each portion 118, 120 may illuminate in the same, uniform color in alternate embodiments. The first and second portions 118, 120 of the light-producing assembly 60 may be separated by insulative, or non-conductive, barriers 122 from proximately disposed portions 118, 120 through any means known in the art such that each portion 118, 120 may be illuminated independently of any other portion 118, 120. Further, each portion 118, 120 disposed within the light-producing assembly 60 may include a respective bus bar 82, 84, 124, 126, 128, 130 coupled to the controller 78 and configured to illuminate each respective portion 118, 120. It should be appreciated that the bus bars 82, 84, 124, 126, 128, 130 may be coupled to each portion 118, 120 of the light-producing assembly 60 on opposing sides in alternate embodiments, as described above.

According to one embodiment, the first and second colors are visually distinguishable from one another. In this manner, LED sources 72a and 72d may be selectively activated using the controller 78 to cause the LED sources 72a, 72d to illuminate in a variety of colors. For example, the controller 78 may activate only LED sources 72a to exclusively illuminate a portion 118 of the light-producing assembly 60 in the first color. Alternatively, the controller 78 may activate only LED sources 72d to exclusively illuminate a portion 120 of the light-producing assembly 60 in the second color. It should be appreciated that the light-producing assembly 60 may include any number of portions 118, 120 having varying LED sources 72a, 72d that may illuminate in any desired color. Moreover, it should also be appreciated that the portions having varying LED sources 72a, 72d may be orientated in any practicable manner and need not be disposed adjacently. Through the use of differing colors and pre-defined patterns, the camera 38 may locate and follow the target assembly 14 disposed on the trailer 18.

The semiconductor ink 74 may also contain various concentrations of LED sources 72a, 72d such that the density of the LED sources 72a, 72d, or number of LED sources 72a, 72d per unit area, may be adjusted for various lighting applications. In some embodiments, the density of LED sources 72a, 72d may vary across the length of the light source 26. For example, a central portion 120 of the light-producing assembly 60 may have a greater density of LED sources 72 than peripheral portions 118, or vice versa. In such embodiments, the light source 26 may appear brighter or have a greater luminance in order to preferentially illuminate pre-defined locations. In other embodiments, the density of LED sources 72a, 72d may increase or decrease with increasing distance from a preselected point.

Still referring to FIG. 5, the target assembly 14 may be configured in a checker pattern 58, as described above. In one arrangement, the first color is green and the second color is red. In another arrangement, the first color is white and the second color is green. However, it should be appreciated that other target assembly 14 shapes, sizes, patterns, and color schemes may be employed. The target assembly 14 may alternatively include a pre-defined pattern of portions that have LED sources 72a, 72d disposed thereon while having unilluminated portions 136 proximately disposed thereto. The unilluminated portions 136 may form any pattern and may be made of any material in any color. In alternate embodiments, the unilluminated portions 136 may contain LED sources 72a, 72d therein that may be controlled by the controller 78 to illuminate while a first function is performed and maintain an unilluminated state while a second function is performed. For example, the target assembly 14 may illuminate in a first pattern (e.g., a substantial portion of the target assembly 14 is illuminated) when the trailer 18 is in a stationary position and may illuminate in a second pattern (e.g., a checker pattern 58) when the trailer 18 begins to move in a rearwardly direction. It should be appreciated that the first and/or second pattern may be any desired symbol or indicia.

Figure 6A:
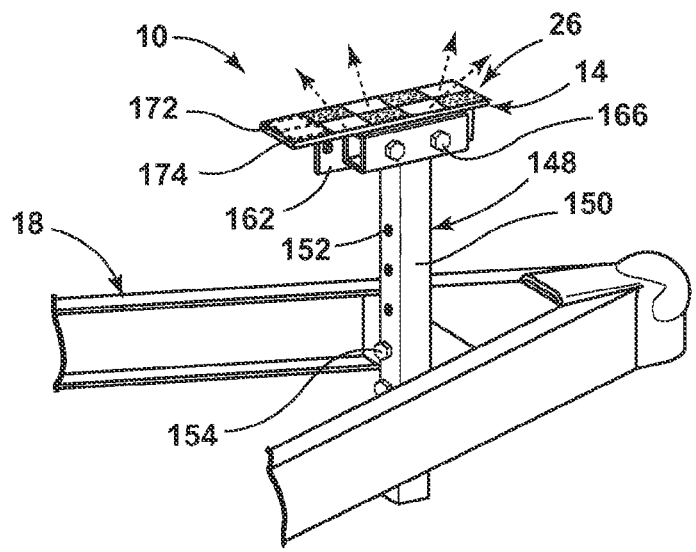
FIG. 6A is a schematic view of a front portion of the trailer having a target mounting system assembled thereto, according to one embodiment.
Figure 6B:
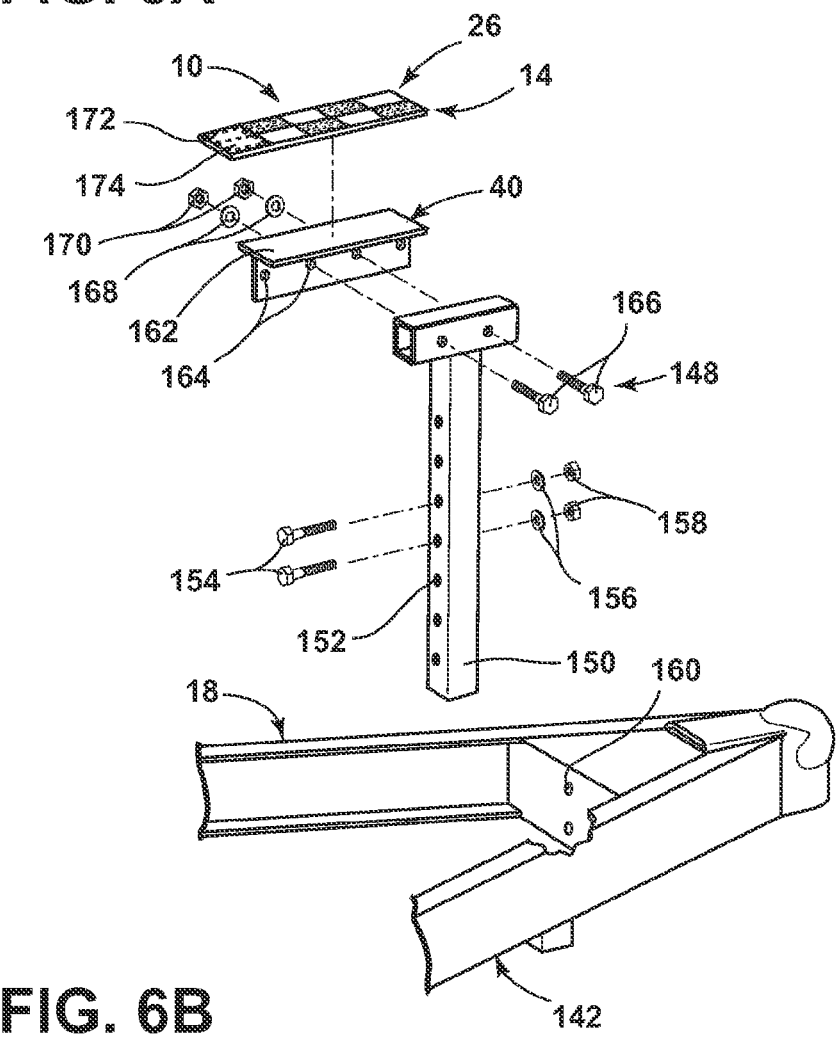
FIG. 6B is an exploded view of the target mounting system and trailer shown in FIG. 6A.

Referring to FIGS. 6A-6B, a target assembly 14 location may be added to a given trailer 18 by use of a target mounting system 148, according to one embodiment. The target mounting system 148 is shown installed onto the trailer 18 to present a target assembly 14 that is viewable by the camera 38 within a desired target placement zone 40. The target mounting system 148 includes a vertical mounting bracket 150 having a plurality of bolt receiver holes 152 extending vertically to allow for a desired vertical height adjustment. The bracket 150 may be assembled onto the trailer 18 via holes using bolts 154, washers 156, and nuts 158. The height of the bracket 150 may be adjusted depending on which holes are aligned with the trailer holes 160. Mounted to the top of the bracket 150 is a target plate 162 having a top target placement zone 40 onto which the target assembly 14 is located. The plate 162 likewise has a plurality of holes 164 that align horizontally with the holes in the bracket 150 and may be assembled thereto via bolts 166, washers 168, and nuts 170. Accordingly, the plate 162 may be adjusted both vertically and horizontally to a desired position so as place the target assembly 14 adjustably within a desired location so that the target assembly 14 is easily acquired by the camera 38 and processed by the image processing. It should be appreciated that assistance in mounting the target mounting system 148 along with the target assembly 14 and verification of proper location of the target mounting system 148 and target assembly 14 may be achieved by utilizing the target assembly 14 placement assist method and target monitoring method discussed above.

It is contemplated that the light source 26 may be electrically connected by a flexible or molded wire that is routed through the target assembly 14 and the trailer 18 to have power supplied thereto by a power source 80 disposed within the vehicle 16. Alternatively, the light source 26 may be powered by a battery and/or any other individual individual power source 172 that may be disposed within the target assembly 14.

Moreover, a solar panel 174 may be connected to a portion of the target assembly 14. The individual power source 172 disposed within the target assembly 14 may be electrically connected with the solar panel 174. The target assembly 14 may include a photoelectric conversion circuit (not shown) which is connected between the batteries and the solar panel 174 so that the solar energy is absorbed by the solar panel 174 and transferred into electric power to be stored in the individual power source 172, which may be configured as batteries. The batteries can be indirectly powered by the solar energy so that the batteries do not need to be replaced frequently. Furthermore, the photoelectric conversion circuit, or controller 78, may control the activation of the light source 26 and the charging modes of the solar panel 174, or to control whether the light source 26 is powered by the batteries and/or the solar panel 174.

Figure 7:
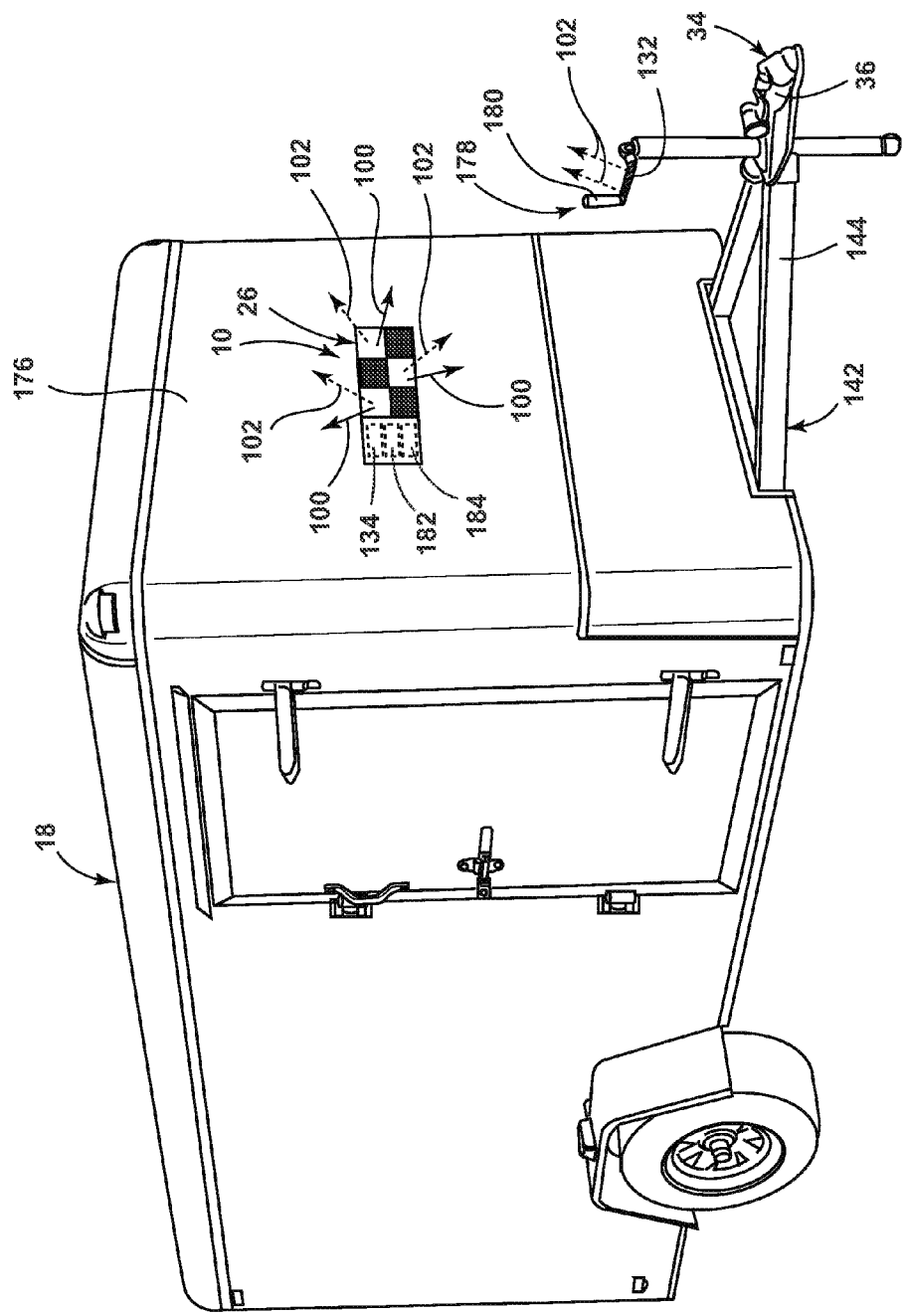
FIG. 7 is an exemplary perspective view of the lighting system employed on a vertical portion of an enclosed trailer having an independent power source therein.

Referring to FIG. 7, the lighting system 10 is configured to attach to a portion of the trailer 18. According to the illustrated embodiment, the target assembly 14 is attached to a forwardly, vertical surface 176 of an enclosed trailer 18. As illustrated, the light-producing assembly 60 emits a substantial portion of the inputted light 100 and outputted light 102 towards a vehicle 16 that may be coupled to the front portion of the trailer 18. However, it is contemplated that the inputted light 100 may be directed in any desired direction depending on the structure and packaging of the lighting assembly.

As illustrated, a second photoluminescent structure 132 is disposed on a feature 178 of the trailer 18, such as a portion of a jack 180 coupled to the trailer 18. As described above, the portion of the light-producing assembly 60 having the photoluminescent structure 62 thereon converts inputted light 100 to outputted light 102 of a different wavelength. A second portion of the light-producing assembly 60 emits inputted light 100 that is then converted by the second photoluminescent structure 132 on the jack 180 to an outputted light 102 of a different wavelength. The outputted light 102 may be used as welcome/farewell sequence light, ambient light, illumination for any feature 178 of the vehicle 16 or the trailer 18, and/or a warning indicator.

As illustrated in FIG. 7, the light-producing assembly 60 may be attached, coupled, and/or over molded to a vertical surface 176 of the trailer 18. According to one embodiment, the light-producing assembly 60 is flushly mounted to the top surface of the trailer 18 thereby partially concealing from view in the unilluminated state. Additionally, the lighting system 10 and/or one or more components thereof have a soft conformable encapsulation to both protect the lighting system 10 and to limit flexing of portions of the lighting system 10. Exemplary materials that may be utilized include, but are not limited to, polyvinyl chloride, vulcanized thermoplastic elastomer, and polyester elastomer.

It is contemplated that the use of a second photoluminescent structure 132 proximate the lighting system 10 may be disposed at any desired location and is not limited to the jack 180. For example, the second photoluminescent structure 132 may be disposed on a portion of the vehicle tailgate 24 to better illuminate an area proximate thereto in low light conditions.

The lighting system 10 may further include a user interface 134 disposed proximately to the lighting system 10, or any other desired location within a vehicle 16. The user interface 134 may be configured such that a user may control the wavelength of light that is emitted by the light source 26 and/or the portions of the light source 26 that are illuminated. Alternatively, the user interface 134 may be used to switch the lighting system 10 through a plurality of modes and/or functions. The user interface 134 may use any type of control known in the art for control the light source 26, such as, but not limited to, switches (e.g., proximity sensors, push-type buttons) and may be disposed in any practicable location. For example, the user interface 134 may be disposed on a portion of the target assembly 14.

Still referring to FIG. 7, a motion detection unit 182 is disposed on the target assembly 14 and may detect a positional change of the trailer 18 by either mechanical or electronic methods. Exemplary methods include, but are not limited to, infrared (passive and active) sensors, optics (video and camera systems), radio frequency energy (radar, microwave and tomographic motion detection) sensors, sound (microphones and acoustic) sensors, vibration (triboelectric, seismic, and inertia-switch) sensors, magnetism (magnetic sensors and magnetometers) sensors, and/or accelerometers.

Once the motion detection unit 182, disposed in the target assembly 14, trailer 18, and/or vehicle 16 senses movement of the trailer 18, the light source 26 may become illuminated. According to one embodiment, the lighting system 10 includes a function within the controller 78 such that the light source 26 may be return to an unilluminated state after not sensing any additional movement of the trailer 18 for a predefined amount of time, such as five minutes. According to an alternate embodiment, the light source 26 may cooperate with the vehicle rear or backup lights, such that the light source 26 is illuminated each time the vehicle transmission is placed in reverse by an occupant thereof.

Still referring to FIG. 7, a photosensor 184, such as a photodiode, may be used for measurement of light intensity at the time of use of the trailer 18. For example, the light intensity in Florida during a clear summer afternoon will generally be higher than the light intensity in Michigan during an overcast summer morning. Thus, by making this type of information known to the controller 78, the controller 78 can adjust the outputted light 102 from the light source 26 such that a constant intensity may be emitted from the target assembly 14. Such a configuration may be easily recognizable to a camera 38 for better utilization of a vehicle function, such as a trailer back up assist function. It should be appreciated that photosensor 184 may vary the intensity of the light source 26 for any desired reason, such as, but not limited to compensation for weather, time, and/or debris that may be disposed on the target assembly 14.

Figure 8:
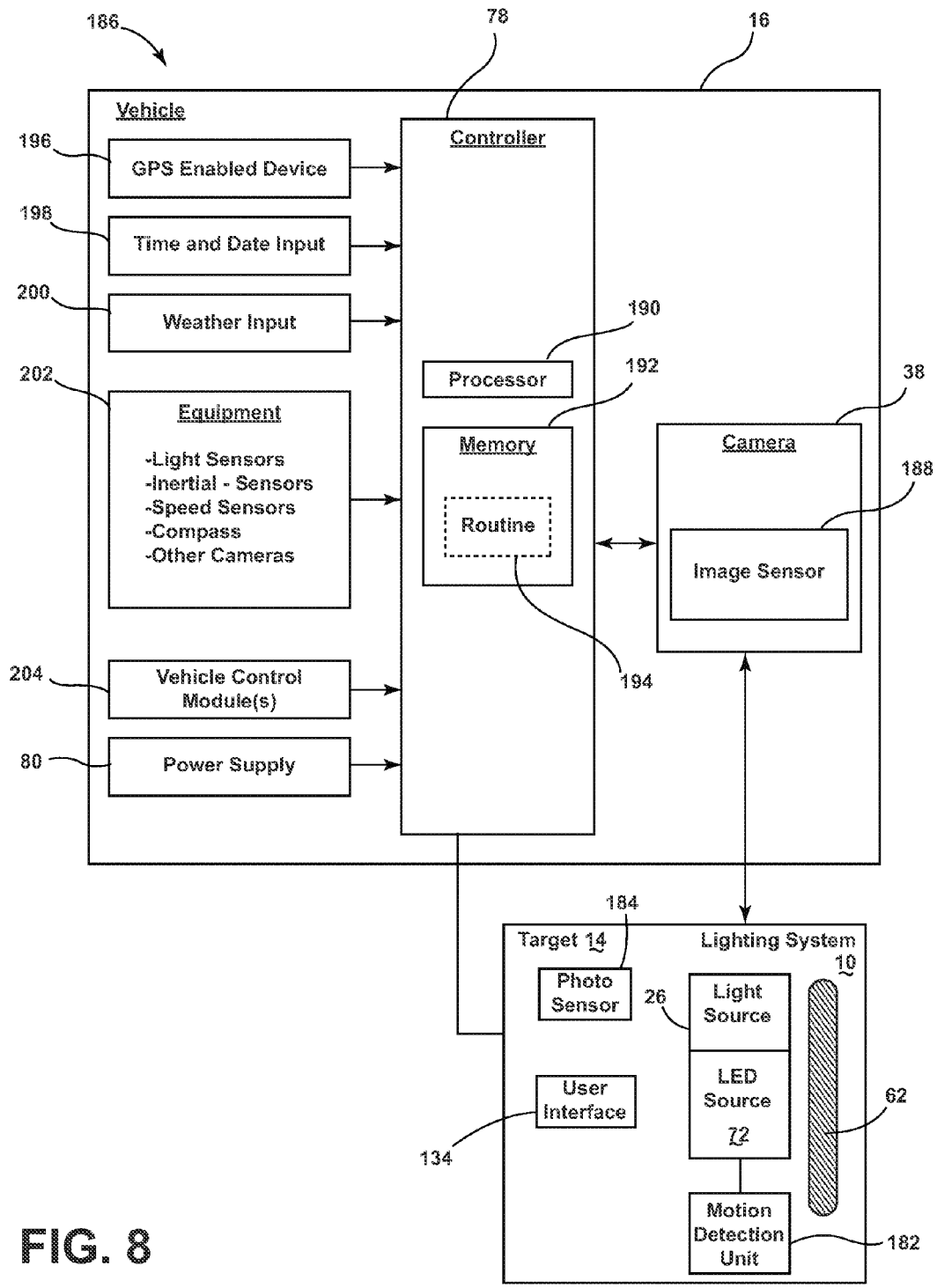
FIG. 8 is a block diagram of the vehicle and the lighting system.

Referring to FIG. 8, an imaging system 186 is shown, according to one embodiment, and is intended for use with the trailer backup assist system 44. The imaging system 186 includes a camera 38 having an image sensor 188 that captures light and converts it into image data. The camera 38 can be mounted to the rear of a tow vehicle 16 and positioned to image a target assembly 14 located on a trailer 18 that is attached to the vehicle 16. The target assembly 14 may be configured in a rectangular configuration having a checker pattern 58 that is recognizable by the camera 38. In one embodiment, the checker pattern 58 alternates between a first color and a second color that is different than the first color, as described above.

The imaging system 186 further includes a controller 78 that may be integrated with the camera 38 or located external thereto. The controller 78 can include circuitry such as a processor 190 and memory 192. A routine 194 for adjusting an image capture setting can be stored in the memory 192 and is executed by the processor 190. In one embodiment, the controller 78 is configured to set a reference point corresponding to an area of the target assembly 14 or trailer 18 that has a known color and a known intensity. By knowing how the reference point should appear in a captured image, the controller 78 can analyze image data received from the camera 38 and adjust the white balance and exposure of the camera 38 to compensate for changing light conditions such as when the vehicle 16 and trailer 18 move from a sunny area to a shaded area. Alternatively, the target assembly 14 and light source 26 may vary in lighting intensity to compensate for environmental factors thereby providing a uniform intensity of emitted light 100, 102 from the target assembly 14.

With respect to the illustrated embodiment, the controller 78 can also communicate with a positioning device 196, shown as a GPS enabled device to receive input related to the geographical location of the vehicle 16 and trailer 18. The GPS enabled device can be any suitable device capable of communicating with the controller 78. In one embodiment, the GPS enabled device is an onboard device such as, but not limited to, a Human Machine Interface (HMI). In another embodiment, the GPS enabled device is a portable electronic device such as, but not limited to, a portable GPS device or a GPS enabled smart device, both capable of wirelessly communicating with the controller 78 via Bluetooth®, WIFI, the like, or a combination thereof. Since light conditions may vary depending on one's geographical location, the controller 78 can give consideration to the locational input supplied by the GPS enabled device in deciding whether an adjustment to the camera 38 and/or intensity of light emitting from the light source 26 is needed.

Since light conditions may also vary depending on the current time, date, and weather conditions, the controller 78 can additionally receive time and date information via input 198 and weather information via input 200, which may either or both be considered by the controller 78 in deciding whether an adjustment to the light source 26 is needed. For example, the light intensity in Florida during a clear summer afternoon will generally be higher than the light intensity in Michigan during an overcast summer morning. Thus, by making this type of information known to the controller 78, the controller 78 can predict certain characteristics related to the light captured by the image sensor 188 of the camera 38 and adjust the image capture settings of the camera 38 and/or light source 26 accordingly. Per the previously given example, if a vehicle 16 and trailer 18 are located in Florida, the controller 78 may choose to decrease the intensity of light emitted from the light source 26 whereas the controller 78 may choose to increase the intensity of light emitted from the light source 26 if the vehicle 16 and trailer 18 are located in Michigan. It is contemplated that the controller 78 can receive the time and date information via the GPS enabled device, a portable electronic device, the electronic control module (ECM) of the vehicle 16, or any other suitable means. The weather information may be supplied to the controller 78 via an application running on a portable electronic device or an onboard device (e.g. HMI), or any other suitable means.

In addition to the abovementioned inputs 198, 200, the controller 78 may receive input from one or more equipment 202 located on the vehicle 16 and/or the trailer 18, which includes, but is not limited to, light sensors, speed sensors, inertia sensors, directional compasses, and/or other cameras 38, which can be provided in front, rear, and side facing configurations. By leveraging some or all of the equipment 202 with other devices and inputs described previously, the controller 78 can determine the orientation of the vehicle 16 and the trailer 18 relative to a light source 26, such as the sun.

According to one embodiment, the imaging system 186 is configured to compensate for changing light conditions caused when the rear vehicle lights of the vehicle 16 are activated. The rear lights may include taillights, brake lights, supplemental lights, and other forms of rear lighting. When activated, the rear lights may project light upon the imaged scene, thereby causing a sudden change in lighting conditions. If unaccounted for, the imaging system 186 may experience difficulty tracking the target assembly 14, thus the light source 26 intensity may adjust to compensate for such conditions.

According to one embodiment, the controller 78 may also provide electrical power to the lighting system 10, via a power source 80 located onboard the vehicle 16. In addition, the controller 78 may be configured to control the inputted light 100 emitted from each light source 26 based on feedback received from one or more vehicle control modules 204 such as, but not limited to, a body control module, engine control module, steering control module, brake control module 54, the like, or a combination thereof. By controlling the inputted light 100 emitted from the light source 26, the lighting system 10 may illuminate in a variety of colors and/or patterns to provide an aesthetic appearance, or may provide vehicle information to an intended observer. For example, when the lighting system 10 is illuminated, the lighting system 10 may notify an occupant of the vehicle 16 about a specific condition of the vehicle 16. It should be appreciated, however, that the target assembly 14 may include an independent controller 78 therein for implementing the functions prescribed herein.

In operation, the photoluminescent structure 62 may exhibit periodic unicolor or multicolor illumination. For example, the controller 78 may prompt the light source 26 to periodically emit only the first wavelength of inputted light 100 via the LED sources 72 to cause the photoluminescent structure 62 to periodically illuminate in the first color. Alternatively, the controller 78 may prompt the light source 26 to periodically emit only the second wavelength of inputted light 100 via LED sources 72 to cause the photoluminescent portion to periodically illuminate in the second color. Alternatively, the controller 78 may prompt the light source 26 to simultaneously and periodically emit the first and second wavelengths of inputted light 100 to cause the photoluminescent structure 62 to periodically illuminate in a third color defined by an additive light mixture of the first and second colors. Alternatively still, the controller 78 may prompt the light source 26 to alternate between periodically emitting the first and second wavelengths of inputted light 100 to cause the photoluminescent structure 62 to periodically illuminate by alternating between the first and second colors. The controller 78 may prompt the light source 26 to periodically emit the first and/or second wavelengths of inputted light 100 at a regular time interval and/or an irregular time interval.

In another embodiment, the lighting system 10 may include a user interface 134. The user interface 134 may be configured such that a user may control the wavelength of inputted light 100 that is emitted by the LED sources 72 and/or the LED sources 72 that are illuminated. Such a configuration may allow a user to control which features 178 (FIG. 7) are illuminated.

With respect to the above examples, the controller 78 may modify the intensity of the emitted first and second wavelengths of inputted light 100 by pulse-width modulation or current control. In some embodiments, the controller 78 may be configured to adjust a color of the emitted inputted light 100 by sending control signals to adjust an intensity or energy output level of the light source 26. For example, if the light source 26 is configured to output the first emission at a low level, substantially all of the first emission may be converted to the second emission. In this configuration, a color of light corresponding to the second emission may correspond to the color of the emitted light from the lighting system 10. If the light source 26 is configured to output the first emission at a high level, only a portion of the first emission may be converted to the second emission. In this configuration, a color of light corresponding to mixture of the first emission and the second emission may be output as the emitted light. In this way, each of the controllers 78 may control an output color of the emitted light.

Though a low level and a high level of intensity are discussed in reference to the first emission of inputted light 100, it shall be understood that the intensity of the first emission of inputted light 100 may be varied among a variety of intensity levels to adjust a hue of the color corresponding to the emitted light from the lighting system 10. The variance in intensity may be manually altered, or automatically varied by the controller 78 based on pre-defined conditions. According to one embodiment, a first intensity may be output from the lighting system 10 when a light sensor senses daylight conditions. A second intensity may be output from the lighting system 10 when the light sensor determines the vehicle 16 is operating in a low light environment.

As described herein, the color of the outputted light 102 may be significantly dependent on the particular photoluminescent materials 96 utilized in the photoluminescent structure 62. Additionally, a conversion capacity of the photoluminescent structure 62 may be significantly dependent on a concentration of the photoluminescent material 96 utilized in the photoluminescent structure 62. By adjusting the range of intensities that may be output from the light source 26, the concentration, types, and proportions of the photoluminescent materials 96 in the photoluminescent structure 62 discussed herein may be operable to generate a range of color hues of the emitted light by blending the first, inputted light 100 with the second, outputted 102 emission.

Accordingly, a lighting system configured as a trailer hitch angle detection component that cooperates with a vehicle is configured to illuminate an area and/or in a pre-defined pattern for recognition by the vehicle has been advantageously provided herein. The lighting system retains its structural properties while providing luminescent light having both functional and decorative characteristics. In some embodiments, the light source 26 may implement a thin design, thereby helping to fit the light source 26 into small package spaces of the vehicle where traditional light sources may not be practicable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A lighting system for a trailer, comprising:
    a hitch angle detection component disposed on a trailer;
    a light source disposed within the detection component;
    a first photoluminescent structure disposed on the light source and configured to luminesce in response to excitation by the light source; and
    a second photoluminescent structure separated from the light source and disposed on a trailer feature, wherein the second photoluminescent structure luminesces in response to light output from the light source.

2. The lighting system for a trailer of claim 1, wherein the light source comprises a plurality of printed LEDs.

3. The lighting system for a trailer of claim 2, wherein the photoluminescent structure comprises at least one photoluminescent material configured to convert an inputted light received from at least a portion of the light source into a visible light that is outputted to a viewable portion.

4. The lighting system for a trailer of claim 3, wherein the inputted light comprises one of blue light, violet light, and UV light.

5. The lighting system for a trailer of claim 1, wherein the hitch angle detection component is configured as a target.

6. The lighting system for a trailer of claim 5, wherein the target cooperates with a trailer backup assist function of a vehicle.

7. The lighting system for a trailer of claim 1, wherein the hitch angle detection component includes a predetermined image pattern of a certain size and shape provided on a top surface for capture by a video camera and recognition by an image processing unit.

8. A trailer system, comprising:
    a hitch angle detection component having a light source; and
    a first luminescent structure disposed on the light source and configured to luminesce in a first color in response to excitation by the light source when a motion detection unit detects a trailer is in motion and in a second, different color when the motion detection unit detects the trailer is stationary.

9. The trailer system of claim 8, wherein the light source comprises a printed LED.

10. The trailer system of claim 8, wherein the light source is powered by a power source disposed within a vehicle and is configured to illuminate when the vehicle is placed in reverse.

11. The trailer system of claim 9, wherein the first luminescent structure comprises at least one luminescent material configured to convert an inputted light received from at least a portion of the printed LED into a visible light that is outputted to a viewable portion.

12. The trailer system of claim 8, further comprising:
    a second luminescent structure separated from the light source.

13. The trailer system of claim 12, wherein the first luminescent structure illuminates in a first color and the second luminescent structure illuminates in a second color.

14. The trailer system of claim 8, wherein the light source is powered by a power source within the hitch angle detection component.

15. A lighting system for a trailer assembly, comprising:
    a hitch angle detection component having a pattern thereon on a trailer component;
    a light source disposed within the hitch angle detection component;
    a photoluminescent structure disposed on the light source, wherein the photoluminescent structure is configured to luminesce in response to excitation by light output from the light source; and
    an overmold material disposed over the photoluminescent structure configured to encapsulate the light source and photoluminescent structure between the overmold material and trailer component.

16. The lighting system for a trailer assembly of claim 15, wherein the light source comprises a plurality of printed LEDs.

17. The lighting system for a trailer assembly of claim 15, further comprising:
    a photosensor configured to measure incident light; and
    a controller configured to maintain a constant intensity of light emitted from the detection component based on a lighting condition of the hitch angle detection component.

18. The lighting system for a trailer assembly of claim 17, further comprising:
    a solar panel connected to a power source disposed within the hitch angle detection component.

19. The lighting system for a trailer assembly of claim 15, further comprising:
    a motion detection unit disposed on the hitch angle detection component configured to detect a positional change of the trailer.

20. The lighting system for a trailer assembly of claim 19, wherein the light source is illuminated when the motion detection unit senses movement of the trailer and returns to an unilluminated state if no motion is sensed for a predetermined amount of time thereafter.

* * * * *